(12) United States Patent
Czanta et al.

(10) Patent No.: US 7,579,053 B2
(45) Date of Patent: *Aug. 25, 2009

(54) LIQUID CRYSTALLINE MEDIUM AND LIQUID CRYSTAL DISPLAY

(75) Inventors: Markus Czanta, Darmstadt (DE); Atsutaka Manabe, Darmstadt (DE); Lars Lietzau, Merck KGAA (DE); Michael Wittek, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 93 days.

This patent is subject to a terminal disclaimer.

(21) Appl. No.: 11/439,532

(22) Filed: May 24, 2006

(65) Prior Publication Data
US 2006/0278850 A1    Dec. 14, 2006

(30) Foreign Application Priority Data

| May 25, 2005 | (EP) | ................................. 05011326 |
| Oct. 13, 2005 | (EP) | ................................. 05022352 |

(51) Int. Cl.
*C09K 19/34* (2006.01)
*C09K 19/30* (2006.01)
*C09K 19/12* (2006.01)

(52) U.S. Cl. ............. 428/1.1; 252/299.61; 252/299.63; 252/299.66

(58) Field of Classification Search ................ 428/1.1; 252/299.61, 299.63, 299.66, 299.67
See application file for complete search history.

(56) References Cited

U.S. PATENT DOCUMENTS

| 5,576,867 | A |   | 11/1996 | Baur et al. |
| 5,598,285 | A |   | 1/1997 | Kondo et al. |
| 5,737,051 | A |   | 4/1998 | Kondo et al. |
| 5,841,498 | A |   | 11/1998 | Baur et al. |
| 5,841,499 | A |   | 11/1998 | Baur et al. |
| 6,124,915 | A |   | 9/2000 | Kondo et al. |
| 6,341,004 | B1 |   | 1/2002 | Kondo et al. |
| 6,724,455 | B2 |   | 4/2004 | Kondo et al. |
| 6,815,017 | B2 | * | 11/2004 | Heckmeier et al. ........... 428/1.1 |
| 7,303,791 | B2 | * | 12/2007 | Heckmeier et al. ........... 428/1.1 |
| 7,438,956 | B2 | * | 10/2008 | Hirschmann et al. ......... 428/1.1 |
| 2003/0197153 | A1 | * | 10/2003 | Heckmeier et al. ..... 252/299.61 |
| 2003/0228426 | A1 | * | 12/2003 | Heckmeier et al. ........... 428/1.1 |
| 2006/0061699 | A1 | * | 3/2006 | Kirsch et al. .................. 349/24 |
| 2007/0001149 | A1 | * | 1/2007 | Manabe et al. ......... 252/299.66 |
| 2008/0083904 | A1 | * | 4/2008 | Wittek et al. ........... 252/299.67 |
| 2008/0199635 | A1 | * | 8/2008 | Hirschmann et al. ......... 428/1.1 |
| 2008/0260971 | A1 | * | 10/2008 | Wittek et al. ................. 428/1.1 |

FOREIGN PATENT DOCUMENTS

| DE | 102004030315 | * | 1/2005 |
| WO | WO-2004/048501 | * | 6/2004 |

OTHER PUBLICATIONS

English translation by computer for DE 102004030315, http://www.worldlingo.com/wl/epo/epo.html?SEED=DE102004030315&SEED_FORMAT=E&ACTION, 2005.*

* cited by examiner

*Primary Examiner*—Shean C Wu
(74) *Attorney, Agent, or Firm*—Millen, White, Zelano, Branigan, P.C.

(57) ABSTRACT

Dielectrically positive liquid crystalline media comprising a dielectrically neutral component, component A, comprising a dielectrically neutral compound of formula I

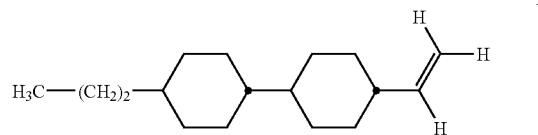

wherein the parameters have the meaning given in the specification, in a high concentration, and a dielectrically positive component, component B, comprising one or more dielectrically positive compounds having a dielectric anisotropy of more than 3, are described. Also described are liquid crystal displays comprising these media, especially to active matrix displays and in particular TN and to IPS displays.

23 Claims, No Drawings

LIQUID CRYSTALLINE MEDIUM AND LIQUID CRYSTAL DISPLAY

FIELD OF THE INVENTION

The present invention relates to liquid crystalline media and to liquid crystal displays comprising these media, especially to displays addressed by an active matrix and in particular to displays of the Twisted Nematic (TN) or of the In Plane Swithching (IPS) type.

SUMMARY OF THE INVENTION

Liquid Crystal Displays (LCDs) are widely used to display information. LCDs are used for direct view displays, as well as for projection type displays. Electro-optical modes employed are e.g. the twisted nematic (TN)-, the super twisted nematic (STN)-, the optically compensated bend (OCB)- and the electrically controlled birefringence (ECB)- mode with their various modifications, as well as others. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In-Plane Swithching mode (as disclosed e.g. in DE 40 00 451 and EP 0 588 568). Especially this electro-optical mode is used for LCDs for modern desktop monitors and is envisaged to be applied for displays for multi media applications. The liquid crystals according to the present invention are preferably used in this type of display.

For these displays, new liquid crystalline media with improved properties are required. Especially the response times have to be improved for many types of applications. Thus, liquid crystalline media with lower viscosities ($\eta$), especially with lower rotational viscosities ($\gamma_1$) are required. The rotational viscosity is preferably 75 mPa·s or less, more preferably 60 mPa·s or less and especially 55 mPa·s or less. Besides this parameter, the media have to exhibit a suitably wide range of the nematic phase, an appropriate birefringence ($\Delta n$) and dielectric anisotropy ($\Delta\epsilon$) should be high enough to allow a reasonably low operation voltage. Preferably $\Delta\epsilon$ should be higher than 4 and very preferably higher than 5, preferably, however, not higher than 15 and in particular not higher than 12, as this would be detrimental for an at least reasonably high specific resistivity.

The displays according to the present invention are preferably addressed by an active matrix (active matrix LCDs, short AMDs), preferably by a matrix of thin film transistors (TFTs). However, the inventive liquid crystals can also beneficially be used in displays with other known addressing means.

There are various different display modes using composite systems of liquid crystal materials of low molecular weight together with polymeric materials. These are e.g. polymer dispersed liquid crystal (PDLC)-, nematic curvi-linearly aligned phase (NCAP)- and polymer network (PN)-systems, as disclosed for example in WO 91/05 029 or axially symmetric microdomain (ASM) systems and others. In contrast to these, the modes especially preferred according to the instant invention are using the liquid crystal medium as such, oriented on surfaces. These surfaces typically are pre-treated to achieve uniform alignment of the liquid crystal material. The display modes according to the instant invention preferably use an electrical field substantially parallel to the composite layer.

Liquid crystal compositions suitable for LCDs and especially for IPS displays are known e.g. from JP 07-181 439 (A), EP 0 667 555, EP 0 673 986, DE 195 09 410, DE 195 28 106, DE 195 28 107, WO 96/23 851 and WO 96/28 521. These compositions, however, do have significant drawbacks. Most of them, amongst other deficiencies, lead to unfavorably long response times, have too low values of the resistivity and/or require operation voltages, which are too high.

Thus, there is a significant need for liquid crystalline media with suitable properties for practical applications such as a wide nematic phase range, appropriate optical anisotropy $\Delta n$, according to the display mode used, a high $\Delta\epsilon$ and especially low viscosities.

Surprisingly, it now has been found that liquid crystalline media with a suitably high $\Delta\epsilon$, a suitable phase range, and $\Delta n$ can be realized, which do not exhibit the drawbacks of the materials of the prior art or at least do exhibit them to a significantly lesser degree.

These improved liquid crystalline media according to the instant application comprise at least the following components:

a dielectrically positive component, component A, comprising a dielectrically neutral compound of formula I: and

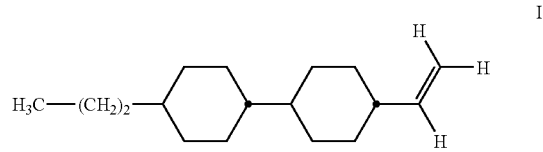

a dielectrically positive component, component B, comprising one or more dielectrically positive compounds having a dielectric anisotropy of more than 3;

and the concentration of the component A in the medium is in the range from 20% to 80%, more preferably from 25% to 70%, even more preferably from 30% to 65% and most preferably from 35% to 60%.

Preferably the dielectrically positive component, component B, comprises, more preferably it consists predominantly of, even more preferably it consists essentially of and most preferably it consists entirely of dielectrically positive compounds having a dielectric anisotropy of more than 3.

Preferably this component, component B, comprises, more preferably it consists predominantly of, even more preferably it consists essentially of and most preferably it consists entirely of one or more dielectrically positive compounds having a dielectric anisotropy of more than 3, selected from the group of compounds of the formulae II and III

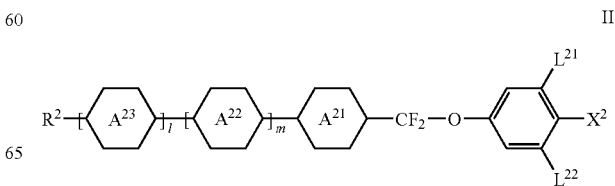

-continued

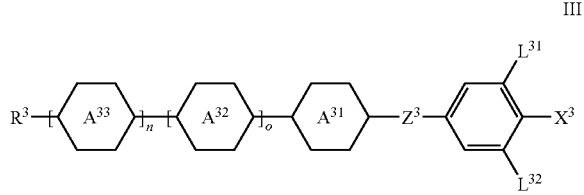

wherein
R² and R³, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and R² and R³ preferably are alkyl or alkenyl,

to

are, independently of each other,

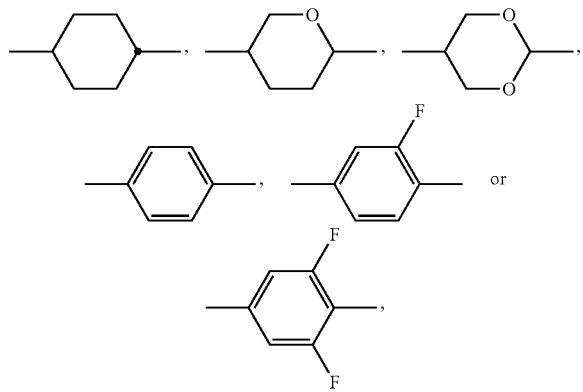

$L^{21}$, $L^{22}$, $L^{31}$ and $L^{32}$, are, independently of each other, H or F, preferably $L^{21}$ and/or $L^{31}$ is F, X² and X³ are, independently of each other, halogen, halogenated alkyl or alkoxy with 1 to 3 C-atoms or halogenated alkenyl or alkenyloxy with 2 or 3 C-atoms, preferably F, Cl, —OCF₃ or —CF₃, most preferably F, Cl or —OCF₃, Z³ is —CH₂CH₂—, —CF₂CF₂—, —COO—, trans- —CH═CH—, trans- —CF═CF—, —CH₂O— or a single bond, preferably —CH₂CH₂—, —COO—, trans- —CH═CH— or a single bond and most preferably —COO—, trans- —CH═CH—, trans- —CF═CF— or a single bond, and l, m, n and o are, independently of each other, 0 or 1.

In a preferred embodiment of the present invention component B, comprises, more preferably it consists predominantly of, even more preferably it consists essentially of and most preferably it consists entirely of one or more dielectrically positive compounds having a dielectric anisotropy of more than 3, selected from the group of compounds of formulae II-1 and II-2

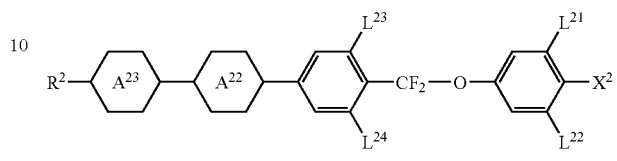

wherein the parameters have the respective meanings given under formula II above and in Formula II-1 the parameters $L^{23}$ and $L^{24}$ are, independently of each other and of the other parameters, H or F.

Preferably component B comprises compounds selected from the group of compounds of formulae II-1 and II-2, wherein $L^{21}$ and $L^{22}$ or $L^{31}$ and $L^{32}$ are both F In a preferred embodiment component B comprises compounds selected from the group of compounds of formulae II-1 and II-2, wherein $L^{21}$, $L^{22}$, $L^{31}$ and $L^{32}$ all are F.

Preferably component B comprises one or more compounds of formula II-1. Preferably the compounds of formula II-1 are selected from the group of compounds of formulae II-1a to II-1e

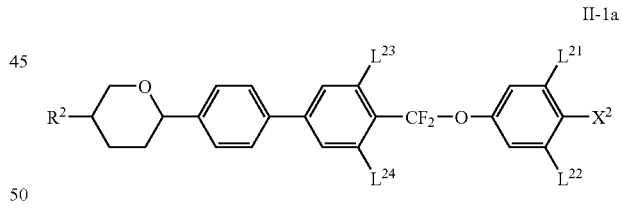

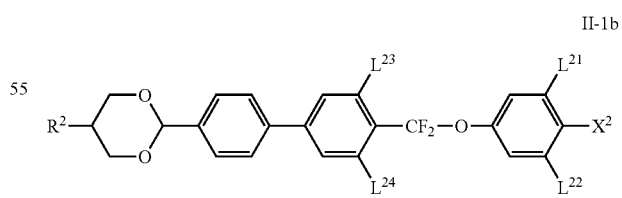

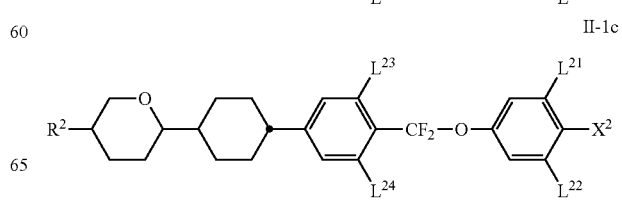

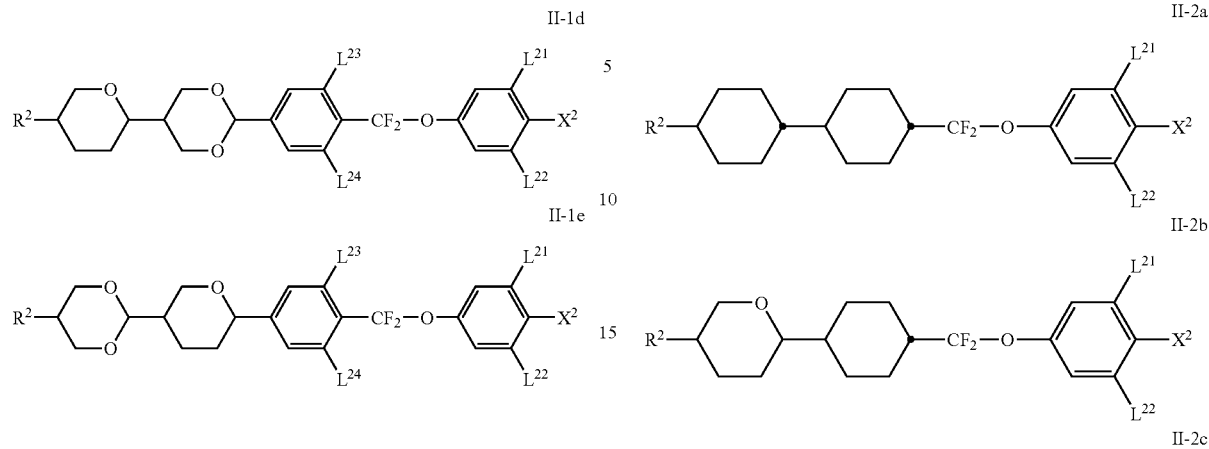

wherein the parameters have the respective meanings given above.

Preferably component B comprises compounds selected from the group of compounds of formulae II-1a to II-1e wherein $L^{21}$ and $L^{22}$ or $L^{31}$ and $L^{32}$ are both F In a preferred embodiment component B comprises compounds selected from the group of compounds of formulae II-1a to II-1e, wherein $L^{21}$, $L^{22}$, $L^{31}$ and $L^{32}$ all are F.

Especially preferred compounds of formula II-1 are

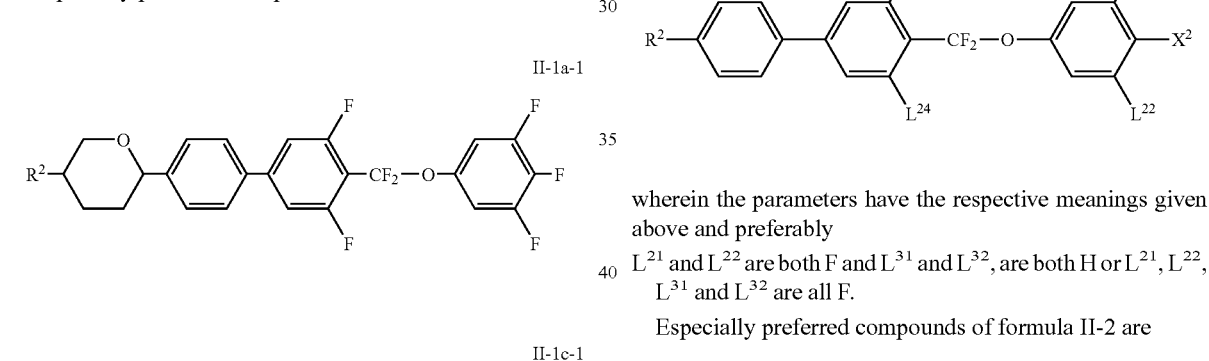

wherein the $R^2$ has the meaning given above.

Preferably Component B comprises one or more compounds of formula II-2. Preferably the compound of formula II-2 are selected from the group of compounds of formulae II-2a to II-2d

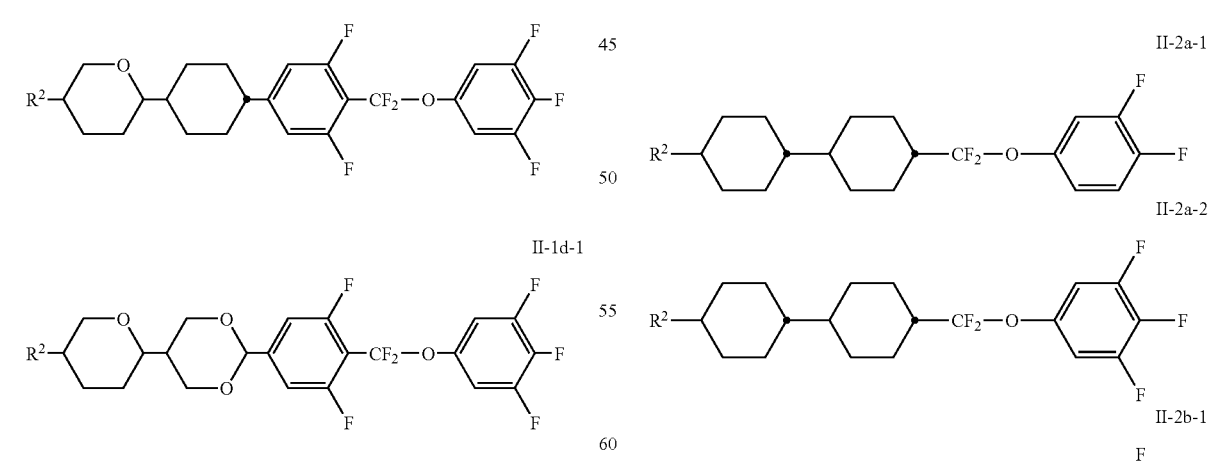

wherein the parameters have the respective meanings given above and preferably $L^{21}$ and $L^{22}$ are both F and $L^{31}$ and $L^{32}$, are both H or $L^{21}$, $L^{22}$, $L^{31}$ and $L^{32}$ are all F.

Especially preferred compounds of formula II-2 are

-continued

II-2d-1

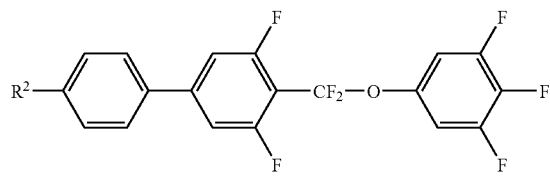

wherein the R² has the meaning given above.

In a further preferred embodiment of the present invention component B, comprises, more preferably it consists predominantly of, even more preferably it consists essentially of and most preferably it consists entirely of one or more dielectrically positive compounds having a dielectric anisotropy of more than 3, selected from the group of formulae III-1 and III-2

III-1

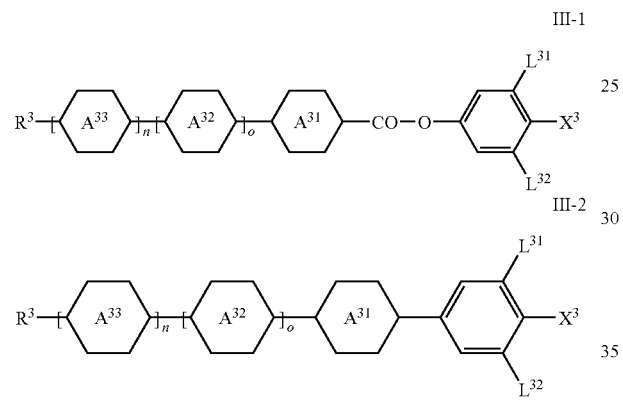

III-2 wherein the parameters have the respective meanings given under formula III above.

Preferably component B comprises one or more compounds of formula III-1. Preferably the compounds of formula III-1 are selected from the group of compounds of formulae III-1a and III-1b III-1a

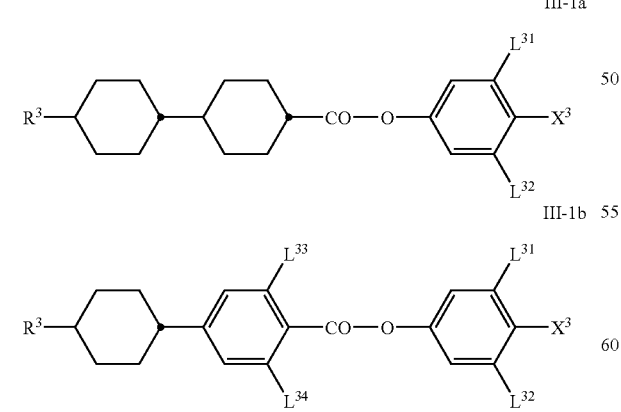

III-1b wherein the parameters have the respective meanings given above and the parameters L³³ and L³⁴ are, independently of each other and of the other parameters, H or F.

Preferably component B comprises one or more compounds of formula III-2. Preferably the compounds of formula III-2 are selected from the group of compounds of formulae III-2a to III-2g

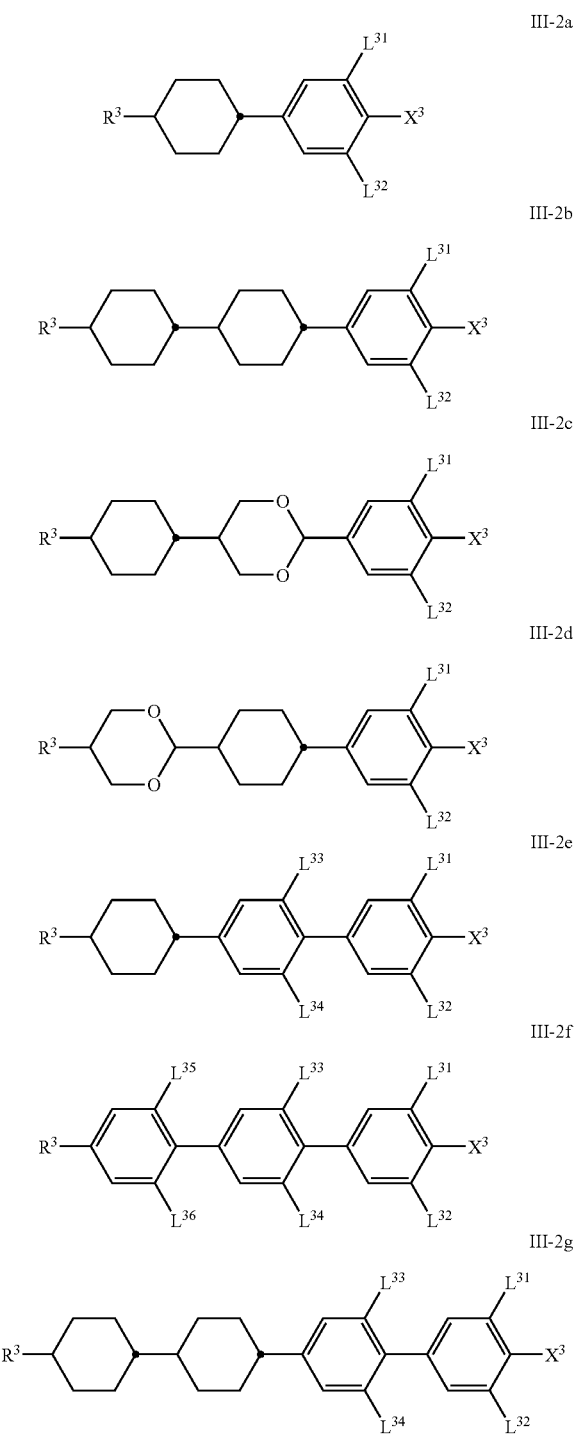

wherein the parameters have the respective meanings given above.

Preferably component B comprises one or more compounds of formula III-1a, which preferably are selected from the group of compounds of formulae III-1a-1 to III-1a-6

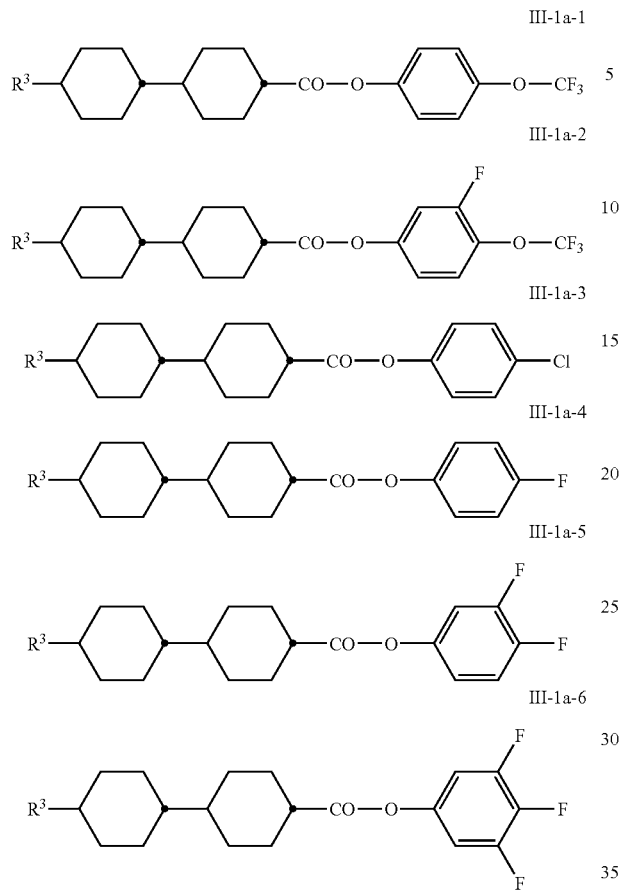

wherein the $R^3$ has the meaning given above.

Preferably component B comprises one or more compounds of formula II-2a, which are preferably selected from the group of compounds of formulae III-2a-1 to III-2a-4

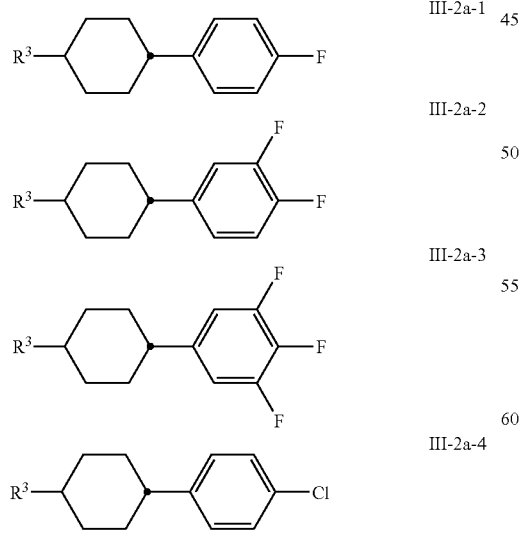

wherein the $R^3$ has the meaning given above.

Preferably component B comprises one or more compounds of formula II-2b, which are preferably selected from the group of compounds of formulae III-2b-1 to III-2b-5

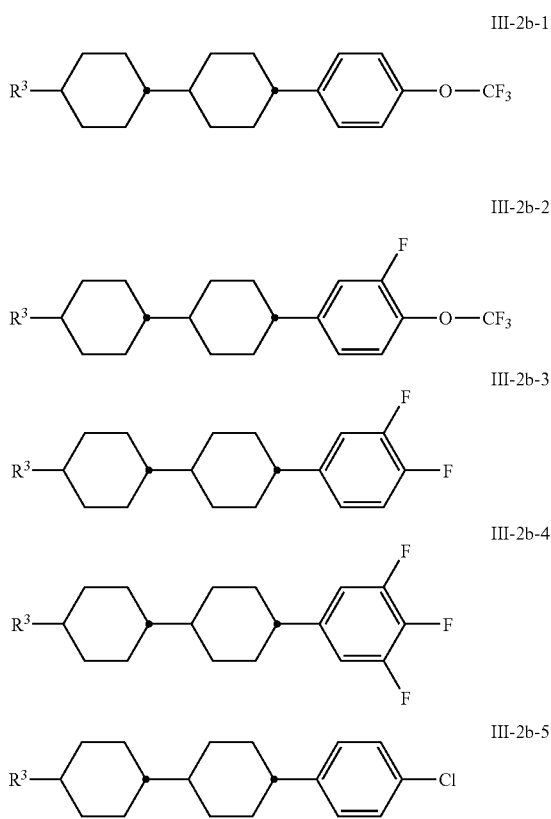

wherein the $R^3$ has the meaning given above.

Preferably component B comprises one or more compounds selected from the group of compounds of formulae III-2c and III-2d, which are preferably selected from the group of compounds of formulae III-2c-1 and III-2d-1

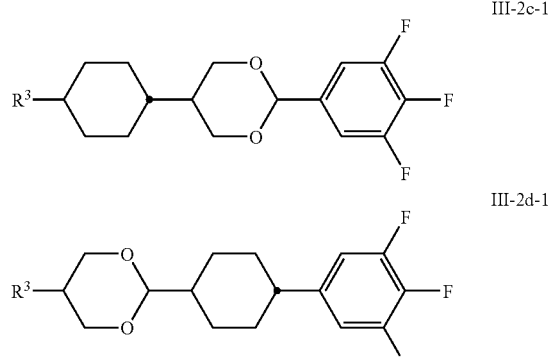

wherein the $R^3$ has the meaning given above.

Preferably component B comprises one or more compounds of formula III-2e, which are preferably selected from the group of formulae III-2e-1 to III-2e-5

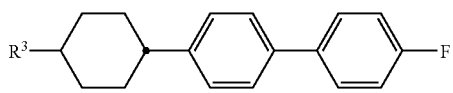
III-2e-1

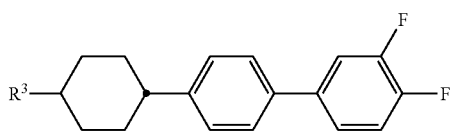
III-2e-2

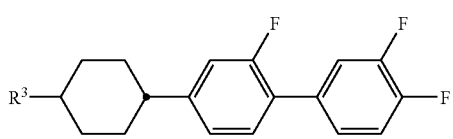
III-2e-3

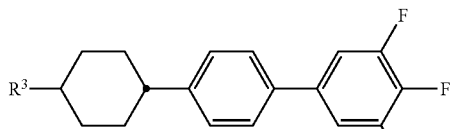
III-2e-4

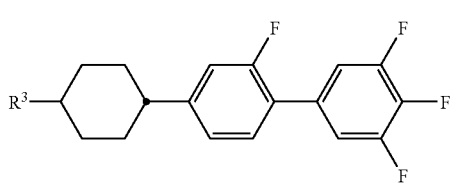
III-2e-5 wherein the $R^3$ has the meaning given above.

Preferably component B comprises one or more compounds of formula III-2f, which are preferably selected from the group of compounds of formulae III-2f-1 to III-2f-5

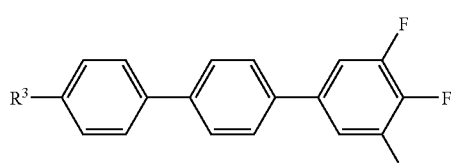
III-2f-1

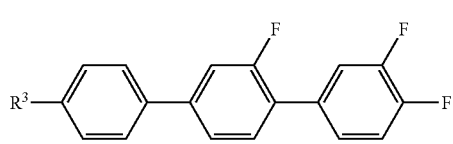
III-2f-2

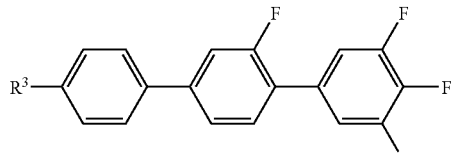
III-2f-3

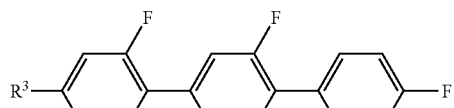
III-2f-4

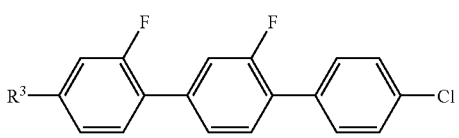
III-2f-5 wherein the $R^3$ has the meaning given above.

Preferably component B comprises one or more compounds of formula III-2g, which are preferably selected from the group of compounds of formulae III-2g-1 to III-2g-3

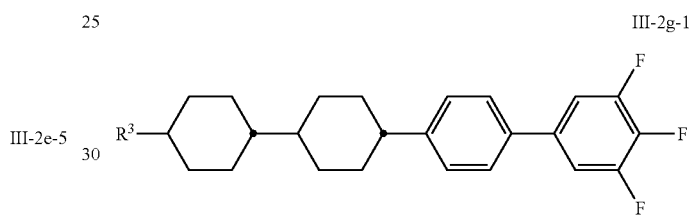
III-2g-1

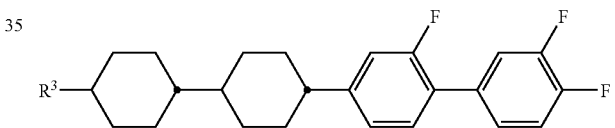
III-2g-2

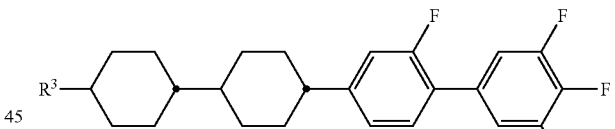
III-2g-3 wherein the $R^3$ has the meaning given above.

Alternatively or additionally to compounds of formulae III-1 and/or III-2 the media according to the present invention my comprise one or more compounds of formula III-3

III-3

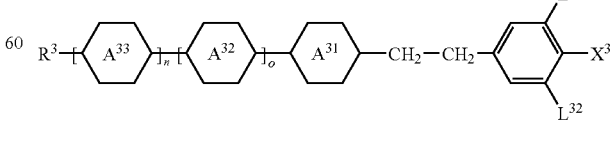

wherein the parameters have the respective meanings given under formula III above and preferably of formula III-3a

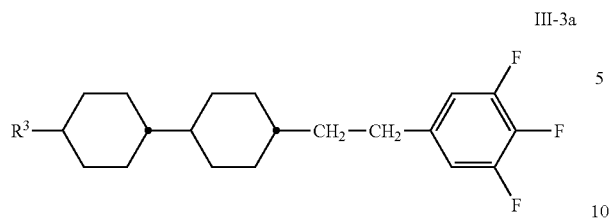

III-3a wherein the $R^3$ has the meaning given above.

Preferably the liquid crystalline media according to the present invention comprise an additional dielectrically neutral component, component C. This component has a dielectric anisotropy in the range from −1.5 to 3. Preferably it comprises, preferably consists predominantly of, preferably consists essentially of and especially preferably consists entirely of dielectrically neutral compounds, having a dielectric anisotropy in the range from −1.5 to 3. Preferably this component comprises one or more, more preferably comprises predominantly of, more preferably comprises essentially of and especially preferably consists entirely of dielectrically neutral compounds, having a dielectric anisotropy in the range from −1.5 to 3, of formula IV

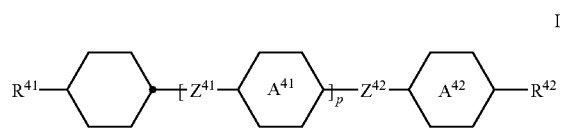

IV wherein
compounds of formula I are excluded from formula IV,
$R^{41}$, and $R^{42}$, independently of each other have the meaning given for $R^2$ under formula II above, preferably $R^{41}$ is alkyl and $R^4$ is alkoxy,

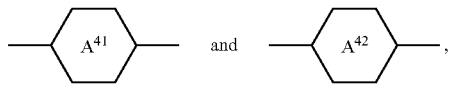

independently of each other, and in case

is present twice, also these, independently of each other, are

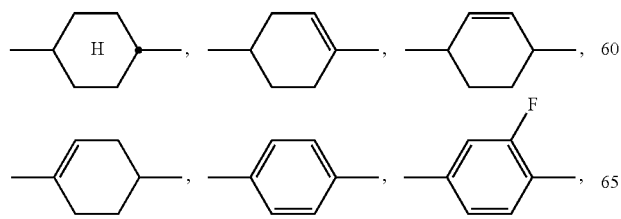

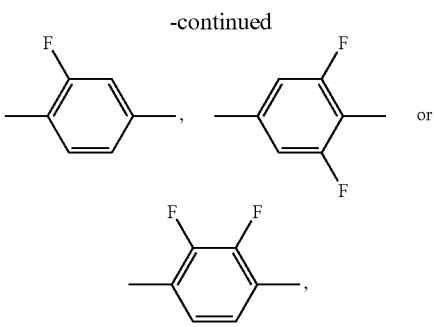

preferably at least one of

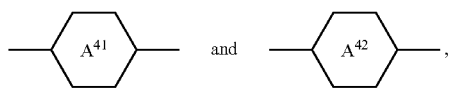

is,

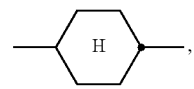

$Z^{41}$ and $Z^{42}$ are, independently of each other, and in case $Z^{41}$ is present twice, also these independently of each other, —CH$_2$CH$_2$—, —COO—, trans- —CH=CH—, trans- —CF=CF—, —CH$_2$O—, —CF$_2$O— or a single bond, preferably at least one of them is a single bond, and
p is 0, 1 or 2, preferably 0 or 1.

Preferably the dielectrically neutral component, component B, comprises one or more compounds selected from the group of compounds of formulae IV-1 to IV-5

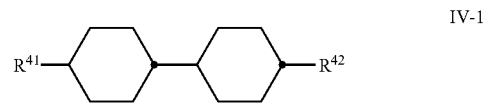
IV-1

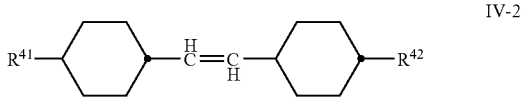
IV-2

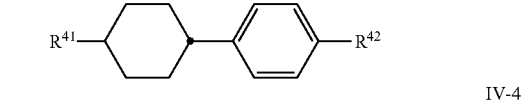
IV-3

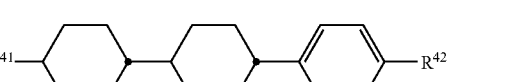
IV-4

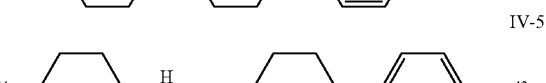
IV-5 wherein compounds of formula I are excluded from formula IV-1, $R^{41}$ and $R^{42}$ have the respective meanings given under formula IV above and in formulae IV-1, IV-4 and IV-5 $R^{41}$ preferably is alkyl or alkenyl, preferably alkenyl and $R^{42}$ preferably is alkyl or alkenyl, preferably alkyl, in formula IV-2 $R^{41}$ and $R^{42}$ preferably are alkyl and in formula IV-3 $R^{41}$ preferably is alkyl or alkenyl, preferably alkyl and $R^{42}$ preferably is alkyl or alkoxy, preferably alkoxy.

Preferably the dielectrically neutral component, component C, comprises one or more compounds selected from the group of compounds of formulae IV-1, IV-3, IV-4 and IV-5, preferably one or more compounds of formula IV-1 and one or more compounds selected from the group of formulae IV-3 and IV-4, preferably one or more compounds each of formulae IV-1, IV-3 and IV-4 and most preferably one or more compounds each of formulae IV-1, IV-3, IV-4 and IV-5.

In a further preferred embodiment of the present invention, which may be according to the previous embodiments or a different one, the liquid crystal mixtures according to the present invention comprise component C, comprising, preferably predominantly consisting of and most preferably entirely consisting of compounds of formula IV selected from the group of compounds of formulae IV-1 to IV-5, as shown above, and optionally of formulae IV-6 to IV-13

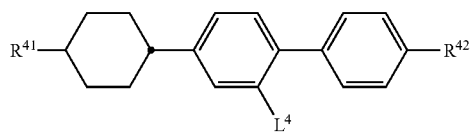
IV-6

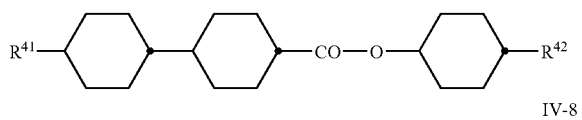
IV-7

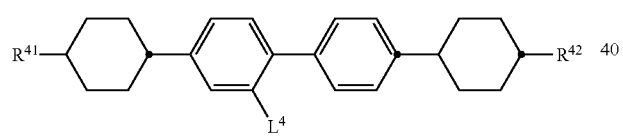
IV-8

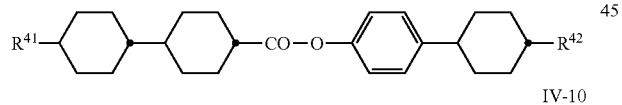
IV-9

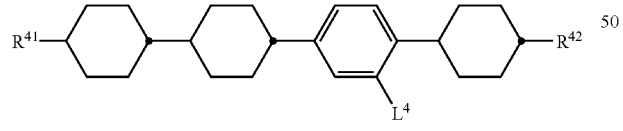
IV-10

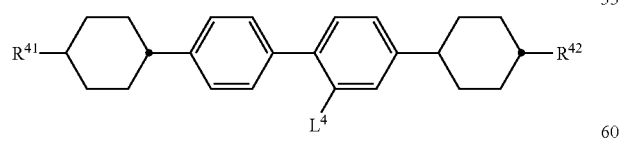
IV-11

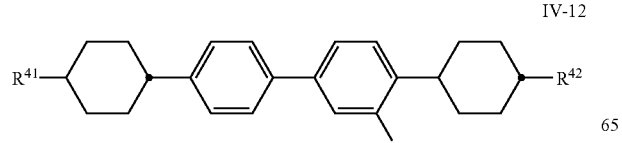
IV-12

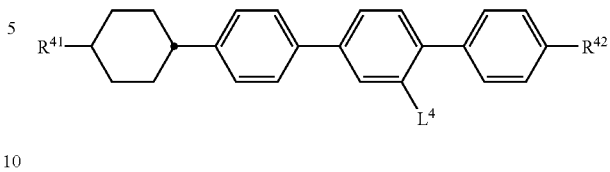
IV-13 wherein $R^{41}$ and $R^{42}$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms and $L^4$ is H or F.

Alternatively or additionally to compounds of formulae II and/or III the media according to the present invention may comprise one or more dielectrically positive compounds of formula V

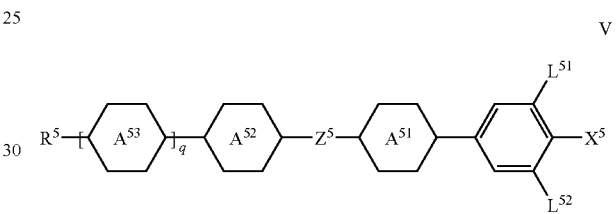
V wherein $R^5$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and $R^5$ preferably is alkyl or alkenyl,

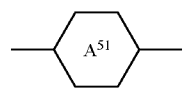

to

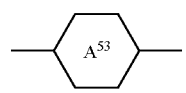

are, independently of each other,

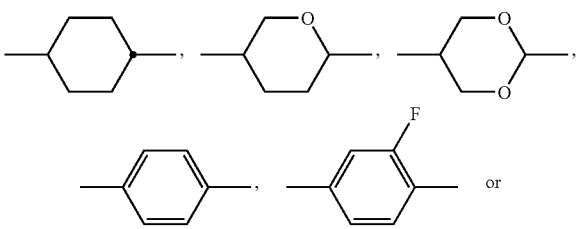

-continued

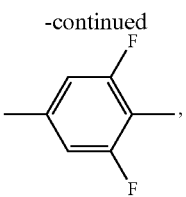

L$^{51}$ and L$^{52}$, are, independently of each other, H or F, preferably L$^{51}$ is F and X$^5$ is halogen, halogenated alkyl or alkoxy with 1 to 3 C-atoms or halogenated alkenyl or alkenyloxy with 2 or 3 C-atoms, preferably F, Cl, —OCF$_3$ or —CF$_3$, most preferably F, Cl or —OCF$_3$, Z$^5$ is —CH$_2$CH$_2$—, —CF$_2$CF$_2$—, —COO—, trans- —CH═CH—, trans- —CF═CF— or —CH$_2$O, preferably —CH$_2$CH$_2$—, —COO— or trans- —CH═CH— and most preferably —COO— or —CH$_2$CH$_2$—, and q is 0 or 1.

Preferably the media according to the present invention comprises one or more compounds of formula V, preferably selected from the group of compounds of formulae V-1 and V-2

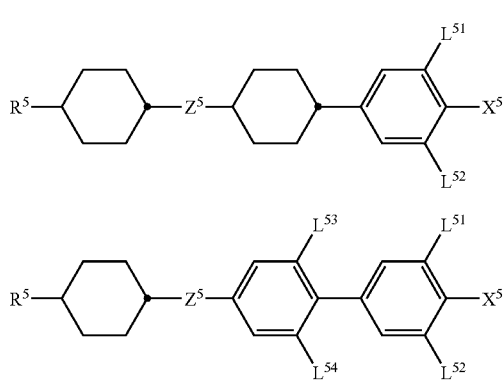

wherein the parameters have the respective meanings given above and the parameters L$^{53}$ and L$^{54}$ are, independently of each other and of the other parameters, H or F and preferably Z$^5$ is —CH$_2$—CH$_2$—.

Preferably the compounds of formula V-1 are selected from the group of compounds of formulae V-1a and V-1b

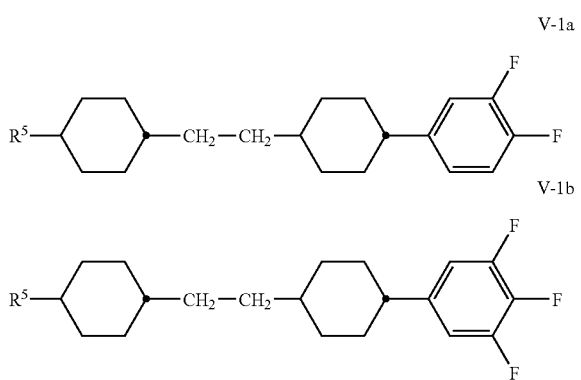

wherein the R$^5$ has the meaning given above.

Preferably the compounds of formula V-2 are selected from the group of compounds of formulae V-2a to V-2d

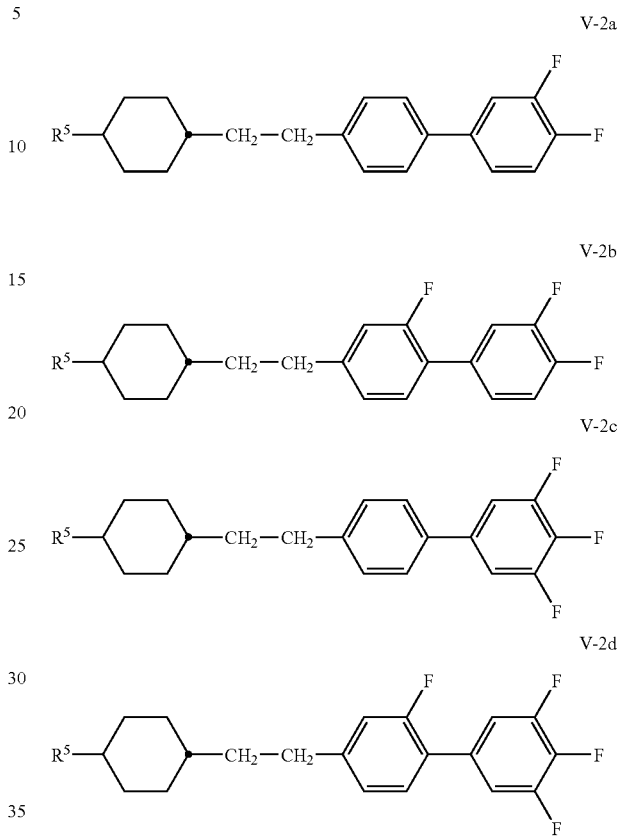

wherein the R$^5$ has the meaning given above.

Preferably the liquid crystalline media according to the present invention comprise an additional dielectrically neutral component, component D. This component has a dielectric anisotropy in the range from −1.5 to 3. Preferably it comprises, preferably consists predominantly of, preferably consists essentially of and especially preferably consists entirely of dielectrically neutral compounds, having a dielectric anisotropy in the range from −1.5 to 3. Preferably this component comprises one or more, more preferably comprises predominantly of, more preferably comprises essentially of and especially preferably consists entirely of dielectrically neutral compounds, having a dielectric anisotropy in the range from −1.5 to 3, of formula VI

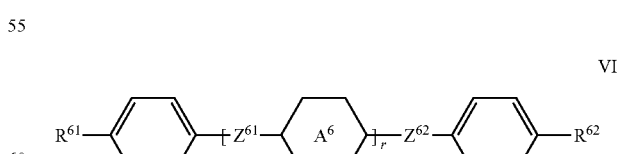

wherein

R$^{61}$, and R$^{62}$, independently of each other have the meaning given for R$^2$ under formula II above, preferably R$^{61}$ is alkyl and R$^{62}$ is alkyl or alkenyl,

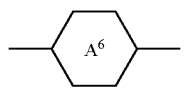

and in case it is occurring twice in each occurrence independently of each other, is

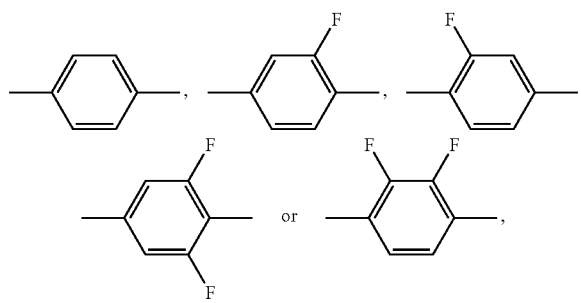

preferably at least one of

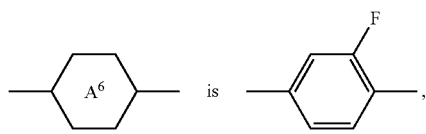

$Z^{61}$ and $Z^{62}$ are, independently of each other, and in case $Z^{61}$ is present twice, also these independently of each other, —CH$_2$CH$_2$—, —COO—, trans- —CH=CH—, trans- —CF=CF—, —CH$_2$O—, —CF$_2$O— or a single bond, preferably at least one of them is a single bond, and r is 0, 1 or 2, preferably 0 or 1.

Preferably the dielectrically neutral component, component D, comprises one or more compounds selected from the group of compounds of formulae VI-1 and VI-2

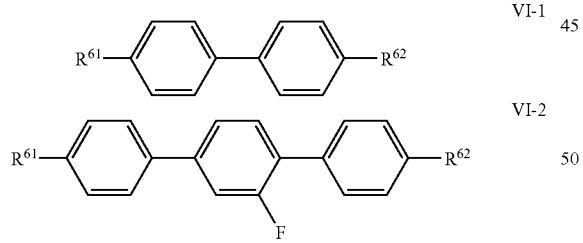

wherein $R^{61}$ and $R^{62}$ have the respective meanings given under formula VI above and $R^{61}$ preferably is alkyl and in formula VI-1 $R^{62}$ preferably is alkenyl, preferably —(CH$_2$)$_2$—CH=CH—CH$_3$ and in formula VI-2 $R^{62}$ preferably is alkyl.

Preferably the dielectrically neutral component, component D, comprises one or more compounds selected from the group of compounds of formulae VI-1 and VI-2 wherein preferably $R^{61}$ is n-alkyl and in formula VI-1 $R^{62}$ preferably is alkenyl and in formula VI-2 $R^{62}$ preferably is n-alkyl.

Preferably the liquid crystal mixtures according to the present invention do contain at least one further component besides components A and B. This third component may be either one of components C and D, preferably the third component present is component C.

Obviously the mixtures according to the present invention also can contain all for components A, B, C and D.

Additionally the liquid crystal mixtures according to the present invention may comprise a further optional component, component E, which has a negative dielectric anisotropy and comprises, preferably predominantly consists of, more preferably essentially consists of and most preferably entirely consists of dielectrically negative compounds preferably of formula VII

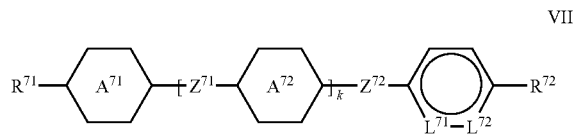

wherein $R^{71}$ and $R^{72}$ independently of each other have the meaning given for $R^2$ under formula II above,

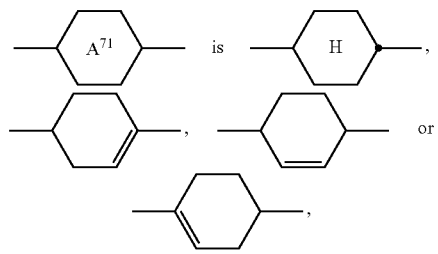

preferably

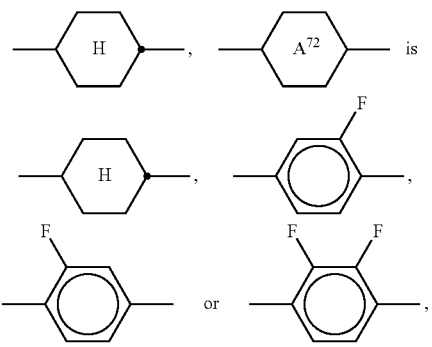

$Z^{71}$ and $Z^{72}$ are, independently of each other, —CH$_2$CH$_2$—, —COO—, trans- CH=CH—, trans- —CF=CF—, —CH$_2$O—, —CF$_2$O— or a single bond, preferably at least one of them is a single bond and most preferably both are a single bond, $L^{71}$ and $L^{72}$ are, independently of each other, C—F or N, preferably at least one of them is C—F and most preferably both of them are C—F and k is 0 or 1.

Preferably the liquid crystalline media according to the instant invention comprise, preferably predominantly consist of and most preferably entirely consist of components A to E and in particular of compounds selected from the group of compounds of formulae I to VII.

"Comprising" in this application means in the context of compositions that the entity referred to, e.g. the medium or the component, contains the component or components or of the compound or compounds in question, preferably in a total concentration of 10% or more and most preferably of 20% or more.

"Predominantly consisting of", in this context, means that the entity referred to contains 55% or more, preferably 60% or more and most preferably 70% or more of the component or components or of the compound or compounds in question.

"Essentially consisting of," in this context, means that the entity referred to contains 80% or more, preferably 90% or more and most preferably 95% or more of the component or components or of the compound or compounds in question.

"Entirely consisting of," in this context, means that the entity referred to contains 98% or more, preferably 99% or more and most preferably 100.0% of the component or components or of the compound or compounds in question.

Component E preferably comprises, preferably predominantly consists of and most preferably entirely consists of one or more compounds of formula VII, preferably selected from the group of compounds of formulae VII-1 to VII-3

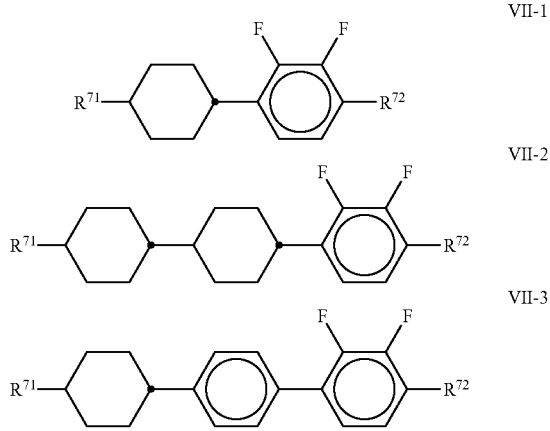

wherein
$R^{71}$ and $R^{72}$ have the respective meanings given under formula VI above.

In formulae VII-1 to VII-3 $R^{71}$ preferably is n-alkyl or 1-E-alkenyl and $R^{72}$ preferably is n-alkyl or alkoxy.

Also other mesogenic compounds, which are not explicitly mentioned above, can optionally and beneficially be used in the media according to the instant invention. Such compounds are known to the expert in the field.

The liquid crystal media according to the instant invention preferably have a clearing point of 70° C. or more, more preferably of 75° C. or more and in particular of 80° C. or more.

The $\Delta n$, at 589 nm ($Na^D$) and 20° C., of the liquid crystal media according to the instant invention preferably is in the range of 0.060 or more to 0.135 or less, more preferably in the range of 0.070 or more to 0.125 or less and most preferably in the range of 0.080 or more to 0.120 or less.

The $\Delta\epsilon$, at 1 kHz and 20° C., of the liquid crystal medium according to the invention is preferably 4.0 or more.

Preferably the nematic phase of the inventive media extends at least from 0° C. or less to 70° C. more, more preferably at least from −20° C. or less to 70° C. more, most preferably at least from −30° C. or less to 75° C. more and in particular at least from −40° C. or less to 75° C. more.

In a first preferred embodiment of the present invention the $\Delta n$ of the liquid crystal media is in the range of 0.090 or more to 0.125 or less, more preferably in the range of 0.095 or more to 0.120 or less and most preferably in the range of 0.100 or more to 0.115 or less, whereas $\Delta\epsilon$ preferably is in the range from 4.0 or more to 7.0 or less.

In a second preferred embodiment of the present invention the $\Delta n$ of the liquid crystal media is n the range of 0.085 or more to 0.130 or less, more preferably in the range of 0.090 or more to 0.125 or less and most preferably in the range of 0.095 or more to 0.120 or less, whereas $\Delta\epsilon$ preferably is 6.0 or more, more preferably 7.0 or more, even more preferably 8.0 or more and most preferably in the range from 8.0 or more to 10.0 or less.

In this embodiment preferably the nematic phase of the inventive media extends at least from −20° C. or less to 70° C. more, more preferably at least from −20° C. or less to 70° C. more, most preferably at least from −30° C. or less to 70° C. more and in particular at least from −40° C. or less to 70° C. more.

In a third preferred embodiment of the present invention the $\Delta n$ of the liquid crystal media is in the range of 0.070 or more to 0.120 or less, more preferably in the range of 0.075 or more to 0.115 or less and most preferably in the range of 0.080 or more to 0.110 or less, whereas $\Delta\epsilon$ preferably is 4.0 or more, more preferably is in the range from 4.0 or more to 14.0 or less and most preferably either in the range from 4.0 or more to 6.0 or less or, particularly preferred in the range from 6.0 or more to 11.0 or less.

In this embodiment preferably the nematic phase of the inventive media extends at least from −20° C. or less to 75° C. more, more preferably at least from −30° C. or less to 70° C. more, most preferably at least from −30° C. or less to 75° C. more and in particular at least from −30° C. or less to 80° C. more.

Component A preferably is used in a concentration from 29% to 65%, more preferably from 33% to 59%, more preferably from 36% to 47%, and most preferably from 39% to 44% of the total mixture.

Component B preferably is used in a concentration from 10% to 60%, more preferably from 15% to 55%, more preferably from 20% to 50% and most preferably from 25% to 45% of the total mixture.

Component C preferably is used in a concentration from 0% to 50%, more preferably from 0% to 40%, more preferably from 0% to 30% and most preferably from 10% to 30% of the total mixture.

Component D preferably is used in a concentration from 0% to 40%, preferably from 0% to 30%, more preferably from 0% to 15% and most preferably from 1% to 10% of the total mixture.

Component E preferably is used in a concentration from 0% to 30%, preferably from 0% to 15% and most preferably from 1% to 10% of the total mixture.

Optionally, the inventive media can comprise further liquid crystal compounds in order to adjust the physical properties. Such compounds are known in the art. Their concentration in the media according to the instant invention is preferably 0% to 30%, more preferably 0% to 20% and most preferably 1% to 15%.

In the first preferred embodiment of the present invention mentioned above component A preferably is used in a concentration from 40% to 65%, more preferably from 45% to 60% and most preferably from 50% to 57% of the total mixture, whereas component D preferably is used in a concentration from 5% to 40%, preferably from 10% to 35% and most preferably from 15% to 30% of the total mixture.

In this preferred embodiment the media preferably comprise one or more compounds of formula VI and most preferably of formula VI-2.

Especially in the second preferred embodiment of the present invention mentioned above component C preferably comprises one or more compounds of formula IV, more preferably of formula IV-1, more preferably of formula CC-n-V and/or CC-n-Vm, more preferably of formula CC-n-V1 and/or CC-n-V and most preferably of formula CC-3-Vm.

In the third preferred embodiment of the present invention mentioned above component A preferably is used in a concentration from 20% to 65%, more preferably from 25% to 60% and most preferably from 30% to 50% of the total mixture, whereas component B preferably is used in a concentration from 10% to 60%, more preferably from 15% to 55% and most preferably from 20% to 50% of the total mixture, whereas Component C preferably is used in a concentration from 0% to 50%, more preferably from 0% to 40%, more preferably from 0% to 30% and most preferably from 5% to 30% of the total mixture, whereas component D preferably is used in a concentration from 0% to 40%, preferably from 0% to 30% and most preferably from 5% to 25% of the total mixture.

Preferably the liquid crystal media contain 50% to 100%, more preferably 70% to 100% and most preferably 80% to 100% and in particular 90% to 100% totally of components A, B, C and D, preferably of components A, B and C, which, in turn, contain, preferably predominantly consist of and most preferably entirely consist of one or more of compounds of formulae I, II, III, IV, V, VI and VII, preferably of formulae I, II, III, IV, V and VI, respectively.

In the present application the term dielectrically positive means compounds or components with $\Delta \epsilon > 3.0$, dielectrically neutral with $-1,5 \leq \Delta \epsilon \leq 3.0$ and dielectrically negative with $\Delta \epsilon < -1,5$. $\Delta \epsilon$ is determined at a frequency of 1 kHz and at 20° C. The dielectric anisotropy of the respective compound is determined from the results of a solution of 10% of the respective individual compound in a nematic host mixture. In case the solubility of the respective compound in the host mixture is less than 10% the concentration is reduced to 5%. The capacities of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany, are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericksz-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \epsilon$) is determined at a frequency of 1 kHz. The threshold voltages, as well as all other electro-optical properties have been determined with test cells prepared at Merck KGaA, Germany. The test cells for the determination of $\Delta \epsilon$ had a cell gap of approximately 20 μm. The electrode was a circular ITO electrode with an area of 1.13 cm² and a guard ring. The orientation layers were lecithin for homeotropic orientation ($\epsilon_\parallel$) and polyimide AL-1054 from Japan Synthetic Rubber for homogeneous orientation ($\epsilon_\perp$). The capacities were determined with a frequency response analyzer Solatron 1260 using a sine wave with a voltage of 0.3 $V_{rms}$. The light used in the electro-optical measurements was white light. The set up used was commercially available equipment of Otsuka, Japan. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 4 to 20 and most preferably of 4 to 16 compounds. These compounds are mixed in conventional way. Generally, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self-evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| $nCF_3$ | $C_nH_{2n+1}$ | $CF_3$ | H | H |
| $nCF_3.F$ | $C_nH_{2n+1}$ | $CF_3$ | H | F |
| $nCF_3.F.F$ | $C_nH_{2n+1}$ | $CF_3$ | F | F |
| $nOCF_3$ | $C_nH_{2n+1}$ | $OCF_3$ | H | H |
| $nOCF_3.F$ | $C_nH_{2n+1}$ | $OCF_3$ | H | F |
| $nOCF_3.F.F$ | $C_nH_{2n+1}$ | $OCF_3$ | F | F |
| $nOCF_2$ | $C_nH_{2n+1}$ | $OCHF_2$ | H | H |
| $nOCF_2.F$ | $C_nH_{2n+1}$ | $OCHF_2$ | H | F |
| $nOCF_2.F.F$ | $C_nH_{2n+1}$ | $OCHF_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |

TABLE A

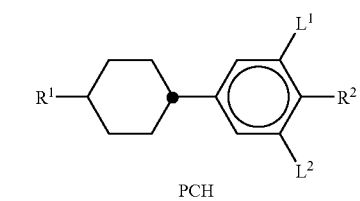

PCH

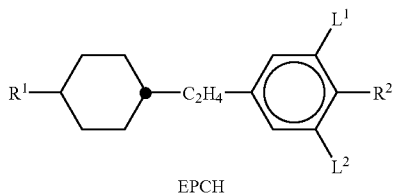

EPCH

TABLE A-continued

BCH

CCP

EBCH

BECH

ECCP

CECP

CEPTP

CCH

TABLE A-continued

D: R¹–[cyclohexane]–COO–[phenyl(L¹,L²)]–R²

PDX: R¹–[dioxane]–[phenyl(L¹,L²)]–R²

ME: R¹–[phenyl]–COO–[phenyl(L¹,L²)]–R²

HP: R¹–[cyclohexane]–[phenyl]–COO–[phenyl(L¹,L²)]–R²

CP: R¹–[cyclohexane]–[cyclohexane]–COO–[phenyl(L¹,L²)]–R²

CH: R¹–[cyclohexane]–[cyclohexane]–COO–[cyclohexane]–R²

EHP: R¹–[cyclohexane]–CH₂CH₂–[phenyl]–COO–[phenyl(L¹,L²)]–R²

TABLE B

CB15: $C_2H_5$–CH(CH₃)*–CH₂–[biphenyl]–CN

C15: $C_2H_5$–CH(CH₃)*–CH₂–O–[biphenyl]–CN

CGP-n-X: $C_nH_{2n+1}$–[cyclohexane]–[phenyl(F)]–[phenyl]–X
(X = F, Cl, "OT" = OCF₃, "OD" = OCF₂H)

CGG-n-X: $C_nH_{2n+1}$–[cyclohexane]–[phenyl(F)]–[phenyl(F)]–X
(X = F, Cl, "OT" = OCF₃, "OD" = OCF₂H)

CGU-n-X: $C_nH_{2n+1}$–[cyclohexane]–[phenyl(F)]–[phenyl(F,F)]–X
(X = F, Cl, "OT" = OCF₃, "OD" = OCF₂H)

PGU-n-X: $C_nH_{2n+1}$–[phenyl]–[phenyl(F)]–[phenyl(F,F)]–X
(X = F, Cl, "OT" = OCF₃, "OD" = OCF₂H)

GP-n-X: $C_nH_{2n+1}$–[phenyl(F)]–[phenyl]–CN

GGP-n-X: $C_nH_{2n+1}$–[phenyl(F)]–[phenyl(F)]–[phenyl]–X
(X = F, Cl, "OT" = OCF₃, "OD" = OCF₂H)

TABLE B-continued

| Structure | Name |
|---|---|
| (structure with cyclohexyl-C₂H₄-phenyl-phenyl-F, CₘH₂ₘ₊₁) | Inm |
| (cyclohexyl-phenyl-phenyl-cyclohexyl) | CBC-nm |
| (cyclohexyl-phenyl-phenyl(F)-cyclohexyl) | CBC-nmF |
| (cyclohexyl-C₂H₄-phenyl-phenyl-cyclohexyl) | ECBC-nm |
| (cyclohexyl-cyclohexyl-CO-O-phenyl-cyclohexyl) | CCPC-nm |
| (cyclohexyl-phenyl-cyclohexyl-cyclohexyl) | CPCC-n-m |
| (C₂H₅-cyclohexyl-COO-phenyl-phenyl-CN) | CHE change |
| (cyclohexyl-cyclohexyl-CH=CH₂) | CC-n-V |
| (cyclohexyl-cyclohexyl-CH=CH-CₘH₂ₘ₊₁) | CC-n-Vm |
| (cyclohexyl-cyclohexyl-(CH₂)ₘ-CH=CH₂) | CC-n-mV |
| (H₂C=CH-cyclohexyl-cyclohexyl-phenyl-CₘH₂ₘ₊₁) | CCP-V-m |
| (CₙH₂ₙ₊₁-CH=CH-cyclohexyl-cyclohexyl-phenyl-CₘH₂ₘ₊₁) | CCP-nV-m |
| (H₂C=CH-CH₂-CH₂-cyclohexyl-cyclohexyl-phenyl-CₘH₂ₘ₊₁) | CCP-V2-m |
| (CₙH₂ₙ₊₁-CH=CH-CH₂-cyclohexyl-cyclohexyl-phenyl-CₘH₂ₘ₊₁) | CCP-nV2-m |
| (H₂C=CH-cyclohexyl-CH=CH-cyclohexyl-phenyl-CₘH₂ₘ₊₁) | CVCP-V-m |
| (CₙH₂ₙ₊₁-CH=CH-cyclohexyl-CH=CH-cyclohexyl-phenyl-CₘH₂ₘ₊₁) | CVCP-nV-m |
| (H₂C=CH-CH₂-CH₂-cyclohexyl-CH=CH-cyclohexyl-phenyl-CₘH₂ₘ₊₁) | CVCP-V2-m |
| (CₙH₂ₙ₊₁-CH=CH-CH₂-cyclohexyl-CH=CH-cyclohexyl-phenyl-CₘH₂ₘ₊₁) | CVCP-nV2-m |
| (H₂C=CH-cyclohexyl-CH=CH-cyclohexyl-phenyl-X) | CVCP-V-X (X = F, Cl, "OT" = OCF₃, "OD" = OCF₂H) |
| (CₙH₂ₙ₊₁-CH=CH-cyclohexyl-CH=CH-cyclohexyl-phenyl-X) | CVCP-nV-X (X = F, Cl, "OT" = OCF₃, "OD" = OCF₂H) |
| (CₙH₂ₙ₊₁-cyclohexyl-dioxane-phenyl(F,F)-X) | CDU-n-X (X = F, Cl, "OT" = OCF₃, "OD" = OCF₂H) |
| (CₙH₂ₙ₊₁-dioxane-cyclohexyl-phenyl(F,F)-X) | DCU-n-X (X = F, Cl, "OT" = OCF₃, "OD" = OCF₂H) |

TABLE B-continued

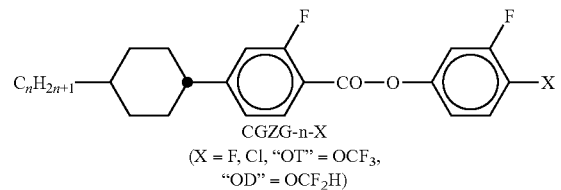

CGZG-n-X
(X = F, Cl, "OT" = OCF$_3$,
"OD" = OCF$_2$H)

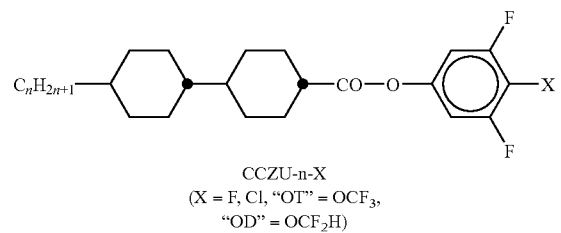

CCZU-n-X
(X = F, Cl, "OT" = OCF$_3$,
"OD" = OCF$_2$H)

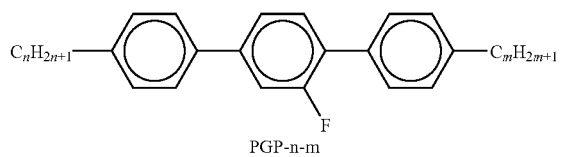

PGP-n-m

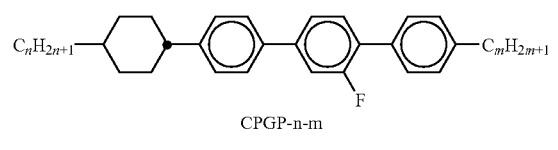

CPGP-n-m

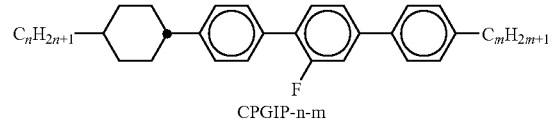

CPGIP-n-m

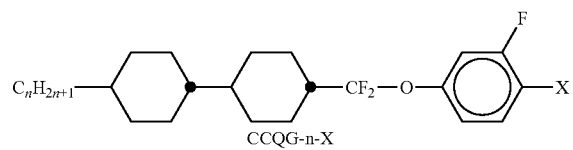

CCQG-n-X
(X = F, Cl, "OT" = OCF$_3$,
"OD" = OCF$_2$H)

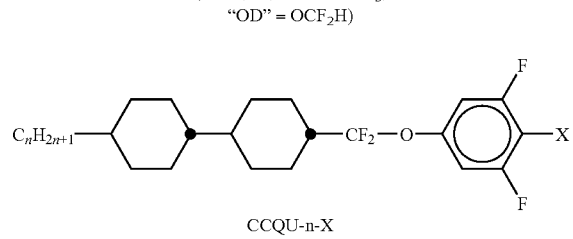

CCQU-n-X
(X = F, Cl, "OT" = OCF$_3$,
"OD" = OCF$_2$H)

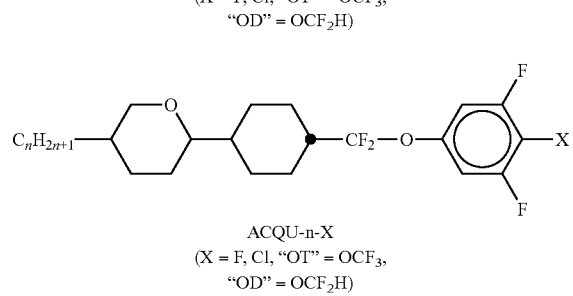

ACQU-n-X
(X = F, Cl, "OT" = OCF$_3$,
"OD" = OCF$_2$H)

TABLE B-continued

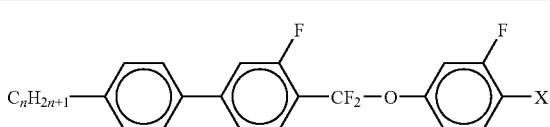

PUQU-n-X
(X = F, Cl, "OT" = OCF$_3$,
"OD" = OCF$_2$H)

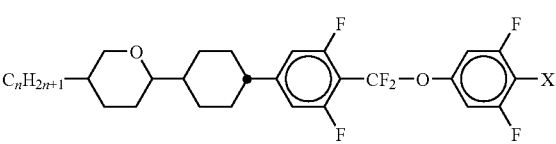

ACUQU-n-X
(X = F, Cl, "OT" = OCF$_3$,
"OD" = OCF$_2$H)

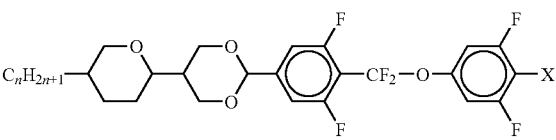

ADUQU-n-X
(X = F, Cl, "OT" = OCF$_3$,
"OD" = OCF$_2$H)

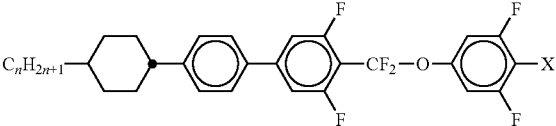

CPUQU-n-X
(X = F, Cl, "OT" = OCF$_3$,
"OD" = OCF$_2$H)

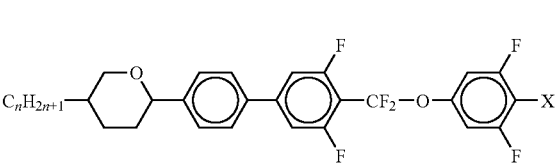

APUQU-n-X
(X = F, Cl, "OT" = OCF$_3$,
"OD" = OCF$_2$H)

TABLE B-continued $C_nH_{2n+1}$—⟨◯⟩—⟨◯⟩—\\

PP-n-V $C_nH_{2n+1}$—⟨◯⟩—⟨◯⟩—\\=\\—$C_mH_{2m+1}$

PP-n-Vm $C_nH_{2n+1}$—⟨◯⟩—⟨◯⟩—\\\\

PP-n-2V $C_nH_{2n+1}$—⟨◯⟩—⟨◯⟩—\\\\=\\—$C_mH_{2m+1}$

PP-n-2Vm

The liquid crystal media according to the instant invention contain preferably
- seven or more, preferably eight or more compounds, preferably of different formulae, selected from the group of compounds of tables A and B and/or
- one or more, more preferably two or more, preferably three or more compounds, preferably of different formulae, selected from the group of compounds of table A and/or
- three or more, more preferably four or more compounds, more preferably five or more, preferably of different formulae, selected from the group of compounds of table B.

EXAMPLES

The examples given in the following are illustrating the present invention without limiting it in any way.

However, the physical properties compositions illustrate to the expert, which properties can be achieved and in which ranges they can be modified. Especially the combination of the various properties, which can be preferably achieved, is thus well defined for the expert.

Comparative Example 1

A liquid crystal mixture is realized with the composition and properties given in the following table.

| Composition Compound | | |
|---|---|---|
| No. | Abbreviation | Conc./% |
| 1 | PGU-2-F | 3.5 |
| 2 | PGU-3-F | 7.0 |
| 3 | CCZU-2-F | 3.0 |
| 4 | CCZU-3-F | 11.0 |
| 5 | CC-3-V1 | 13.0 |
| 6 | CC-5-V | 16.0 |
| 7 | CCP-V-1 | 2.5 |
| 8 | CCP-V2-1 | 4.0 |
| 9 | CCP-20CF3 | 6.0 |
| 10 | CCP-30CF3 | 6.0 |
| 11 | CCP-40CF3 | 6.0 |
| 12 | PUQU-2-F | 7.0 |
| 13 | PUQU-3-F | 7.0 |
| 14 | PCH-302 | 8.0 |
| Σ | | 100.0 |

| Physical Properties | |
|---|---|
| T(N, I) = | 74.5° C. |
| $n_e$ (20° C., 589.3 nm) = | 1.5772 |
| Δn (20° C., 589.3 nm) = | 0.0972 |
| ε\|\| (20° C., 1 kHz) = | 12.0 |
| Δε (20° C., 1 kHz) = | 8.4 |
| $γ_1$ (20° C.) = | 73 mPa · s |
| $k_1$ (20° C.) = | 12.9 pN |
| $k_3/k_1$ (20° C.) = | 0.98 |
| $V_0$ (20° C.) = | 1.30 V |

This mixture has a favorably low value of Δn, a moderately high value of Δ∈ and a moderately low rotational viscosity. Thus it is suited for displays operating in the IPS mode.

Example 1

A liquid crystal mixture is realized with the composition and properties given in the following table.

| Composition Compound | | |
|---|---|---|
| No. | Abbreviation | Conc./% |
| 1 | PGU-2-F | 9.0 |
| 2 | PGU-3-F | 2.0 |
| 3 | CCZU-3-F | 14.0 |
| 4 | CCGU-3-F | 5.0 |
| 5 | CC-3-V | 34.0 |
| 6 | CCP-V-1 | 9.0 |
| 7 | CCP-V2-1 | 4.0 |
| 8 | CCP-30CF3 | 8.0 |
| 9 | PUQU-2-F | 7.0 |
| 10 | PUQU-3-F | 8.0 |
| Σ | | 100.0 |

| Physical Properties | |
|---|---|
| T(N, I) = | 76.5° C. |
| $n_e$ (20° C., 589.3 nm) = | 1.5819 |
| Δn (20° C., 589.3 nm) = | 0.0983 |
| ε\|\| (20° C., 1 kHz) = | 12.6 |
| Δε (20° C., 1 kHz) = | 9.0 |
| $γ_1$ (20° C.) = | 66 mPa · s |
| $k_1$ (20° C.) = | 11.5 pN |
| $k_3/k_1$ (20° C.) = | 0.90 |
| $V_0$ (20° C.) = | 1.19 V |

This mixture has a favorably low value of Δn, a moderately high value of Δ∈ and a very low rotational viscosity. Thus it is very well suited for displays operating in the IPS mode.

Example 2

A liquid crystal mixture is realized with the composition and properties given in the following table.

| Composition Compound | | |
|---|---|---|
| No. | Abbreviation | Conc./% |
| 1 | CDU-2-F | 3.0 |
| 2 | PGU-3-F | 7.5 |
| 3 | PUQU-2-F | 7.5 |
| 4 | PUQU-3-F | 8.0 |
| 5 | CC-3-V | 38.0 |
| 6 | CCP-V-1 | 11.0 |
| 7 | CCP-V2-1 | 12.5 |
| 8 | CCGU-3-F | 4.5 |
| 9 | APUQU-2-F | 8.0 |
| Σ | | 100.0 |

| Physical Properties | |
|---|---|
| T(N, I) = | 76.0° C. |
| $n_e$ (20° C., 589.3 nm) = | 1.5867 |
| $\Delta n$ (20° C., 589.3 nm) = | 0.0994 |
| $\epsilon_\parallel$ (20° C., 1 kHz) = | 12.4 |
| $\Delta\epsilon$ (20° C., 1 kHz) = | 8.9 |
| $\gamma_1$ (20° C.) = | 64 mPa·s |
| $k_1$ (20° C.) = | 11.4 pN |
| $k_3/k_1$ (20° C.) = | 1.19 |
| $V_0$ (20° C.) = | 1.19 V |

This mixture has a favorably low value of $\Delta n$, a high value of $\Delta\epsilon$ and a low rotational viscosity. Thus it is very well suited for displays operating in the IPS mode.

Example 3

A liquid crystal mixture is realized with the composition and properties given in the following table.

| Composition Compound | | |
|---|---|---|
| No. | Abbreviation | Conc./% |
| 1 | ADUQU-2-F | 8.0 |
| 2 | PGU-2-F | 8.0 |
| 3 | PGU-3-F | 2.5 |
| 4 | PUQU-2-F | 6.0 |
| 5 | PUQU-3-F | 8.0 |
| 6 | CC-3-V | 39.0 |
| 7 | CCP-V-1 | 14.0 |
| 8 | CCP-V2-1 | 10.5 |
| 9 | CCGU-3-F | 4.0 |
| Σ | | 100.0 |

| Physical Properties | |
|---|---|
| T(N, I) = | 76.5° C. |
| $n_e$ (20° C., 589.3 nm) = | 1.5853 |
| $\Delta n$ (20° C., 589.3 nm) = | 0.0990 |
| $\epsilon_\parallel$ (20° C., 1 kHz) = | 12.5 |
| $\Delta\epsilon$ (20° C., 1 kHz) = | 8.9 |
| $\gamma_1$ (20° C.) = | 64 mPa·s |
| $k_1$ (20° C.) = | 11.8 pN |
| $k_3/k_1$ (20° C.) = | 1.19 |
| $V_0$ (20° C.) = | 1.21 V |

This mixture has a favorably low value of $\Delta n$, a high value of $\Delta\epsilon$ and a low rotational viscosity. Thus it is very well suited for displays operating in the IPS mode.

Comparative Example 2

A liquid crystal mixture is realized with the composition and properties given in the following table.

| Composition Compound | | |
|---|---|---|
| No. | Abbreviation | Conc./% |
| 1 | CCP-20CF3 | 8.0 |
| 2 | CCP-30CF3 | 8.0 |
| 3 | CGZP-2-OT | 4.0 |
| 4 | CCZU-3-F | 13.0 |
| 5 | BCH-3F.F.F | 8.0 |
| 6 | PGU-2-F | 7.0 |
| 7 | PGU-3-F | 9.0 |
| 8 | CC-3-V1 | 12.0 |
| 9 | CC-5-V | 18.0 |
| 10 | CCGU-3-F | 5.0 |
| 11 | PUQU-2-F | 3.0 |
| 12 | PUQU-3-F | 5.0 |
| Σ | | 100.0 |

| Physical Properties | |
|---|---|
| T(N, I) = | 80.0° C. |
| $n_e$ (20° C., 589.3 nm) = | 1.5891 |
| $\Delta n$ (20° C., 589.3 nm) = | 0.1082 |
| $\epsilon_\parallel$ (20° C., 1 kHz) = | 14.8 |
| $\Delta\epsilon$ (20° C., 1 kHz) = | 11.0 |
| $\gamma_1$ (20° C.) = | 95 mPa·s |
| $k_1$ (20° C.) = | 12.3 pN |
| $k_3/k_1$ (20° C.) = | 0.98 |
| $V_0$ (20° C.) = | 1.13 V |

This mixture has a favorably low value of $\Delta n$, a moderately high value of $\Delta\epsilon$ and a moderately low rotational viscosity. Thus it is suited for displays operating in the IPS mode.

Example 4

A liquid crystal mixture is realized with the composition and properties given in the following table.

| Composition Compound | | |
|---|---|---|
| No. | Abbreviation | Conc./% |
| 1 | CCP-30CF3 | 2.0 |
| 2 | CCZU-3-F | 15.0 |
| 3 | PGU-2-F | 9.0 |
| 4 | PGU-3-F | 4.0 |
| 5 | CC-3-V | 25.0 |
| 6 | CCGU-3-F | 9.0 |
| 7 | CCP-V-1 | 11.5 |
| 8 | CCP-V2-1 | 6.0 |
| 9 | PUQU-2-F | 9.0 |
| 10 | PUQU-3-F | 9.5 |
| Σ | | 100.0 |

| Physical Properties | |
|---|---|
| T(N, I) = | 82.5° C. |
| $n_e$ (20° C., 589.3 nm) = | 1.5985 |
| $\Delta n$ (20° C., 589.3 nm) = | 0.1103 |

-continued

| Composition Compound | |
|---|---|
| ε‖ (20° C., 1 kHz) = | 15.8 |
| Δε (20° C., 1 kHz) = | 11.9 |
| $\gamma_1$ (20° C.) = | 89 mPa·s |
| $k_1$ (20° C.) = | 11.6 pN |
| $k_3/k_1$ (20° C.) = | 1.17 |
| $V_0$ (20° C.) = | 1.04 V |

This mixture has a favorably low value of Δn, a high value of Δε and a low rotational viscosity. Thus it is very well suited for displays operating in the IPS mode.

Example 5

A liquid crystal mixture is realized with the composition and properties given in the following table.

| Composition Compound | | |
|---|---|---|
| No. | Abbreviation | Conc./% |
| 1 | PGU-2-F | 9.0 |
| 2 | PGU-3-F | 1.5 |
| 3 | PUQU-2-F | 9.0 |
| 4 | PUQU-3-F | 9.0 |
| 5 | CC-3-V | 31.0 |
| 6 | CCP-V-1 | 14.0 |
| 7 | CCP-V2-1 | 13.0 |
| 8 | APUQU-2-F | 9.5 |
| 9 | CCGU-3-F | 4.0 |
| Σ | | 100.0 |

| Physical Properties | |
|---|---|
| T(N, I) = | 79.0° C. |
| $n_e$ (20° C., 589.3 nm) = | 1.6006 |
| Δn (20° C., 589.3 nm) = | 0.1097 |
| ε‖ (20° C., 1 kHz) = | 14.3 |
| Δε (20° C., 1 kHz) = | 10.7 |
| $\gamma_1$ (20° C.) = | 74 mPa·s |
| $k_1$ (20° C.) = | 11.8 pN |
| $k_3/k_1$ (20° C.) = | 1.16 |
| $V_0$ (20° C.) = | 1.10 V |

This mixture has a favorably low value of Δn, a high value of Δε and a low rotational viscosity. Thus it is very well suited for displays operating in the IPS mode.

Example 6

A liquid crystal mixture is realized with the composition and properties given in the following table.

| Composition Compound | | |
|---|---|---|
| No. | Abbreviation | Conc./% |
| 1 | ADUQU-3-F | 9.0 |
| 2 | PGU-2-F | 9.0 |
| 3 | PUQU-2-F | 9.0 |
| 4 | PUQU-3-F | 10.0 |
| 5 | CC-3-V | 27.0 |
| 6 | CCP-V-1 | 15.0 |
| 7 | CCP-V2-1 | 14.0 |
| 8 | PP-1-2V1 | 3.0 |
| 9 | CCGU-3-F | 4.0 |
| Σ | | 100.0 |

| Physical Properties | |
|---|---|
| T(N, I) = | 80.0° C. |
| $n_e$ (20° C., 589.3 nm) = | 1.5887 |
| Δn (20° C., 589.3 nm) = | 0.1097 |
| ε‖ (20° C., 1 kHz) = | 15.0 |
| Δε (20° C., 1 kHz) = | 11.3 |
| $\gamma_1$ (20° C.) = | 79 mPa·s |
| $k_1$ (20° C.) = | 12.3 pN |
| $k_3/k_1$ (20° C.) = | 1.18 |
| $V_0$ (20° C.) = | 1.10 V |

This mixture has a favorably low value of Δn, a high value of Δε and a low rotational viscosity. Thus it is very well suited for displays operating in the IPS mode.

Comparative Example 3

A liquid crystal mixture is realized with the composition and properties given in the following table.

| Composition Compound | | |
|---|---|---|
| No. | Abbreviation | Conc./% |
| 1 | PGU-2-F | 9.0 |
| 2 | CDU-2-F | 6.0 |
| 3 | CDU-3-F | 6.0 |
| 4 | PUQU-2-F | 11.0 |
| 5 | PUQU-3-F | 11.0 |
| 6 | CCZU-2-F | 3.0 |
| 7 | CCZU-3-F | 14.0 |
| 8 | CCZU-5-F | 2.0 |
| 9 | CC-5-V | 12.5 |
| 10 | CC-3-V1 | 11.0 |
| 11 | CCP-V2-1 | 12.5 |
| 12 | CCPC-33 | 2.0 |
| Σ | | 100.0 |

| Physical Properties | |
|---|---|
| T(N, I) = | 75.0° C. |
| $n_e$ (20° C., 589.3 nm) = | 1.5829 |
| Δn (20° C., 589.3 nm) = | 0.0997 |
| ε‖ (20° C., 1 kHz) = | 18.4 |
| Δε (20° C., 1 kHz) = | 13.9 |
| $\gamma_1$ (20° C.) = | 99 mPa·s |
| $k_1$ (20° C.) = | 11.3 pN |
| $k_3/k_1$ (20° C.) = | 1.03 |
| $V_0$ (20° C.) = | 0.95 V |

This mixture has a favorably low value of Δn, a moderately high value of Δε and a moderately low rotational viscosity. Thus it is suited for displays operating in the IPS mode.

Example 7

A liquid crystal mixture is realized with the composition and properties given in the following table.

| Composition Compound | | |
|---|---|---|
| No. | Abbreviation | Conc./% |
| 1 | PGU-2-F | 3.0 |
| 2 | CDU-2-F | 9.0 |
| 3 | PUQU-2-F | 11.0 |
| 4 | PUQU-3-F | 10.0 |
| 5 | CCP-3OCF3 | 7.0 |
| 6 | CCZU-2-F | 4.0 |
| 7 | CCZU-3-F | 6.5 |
| 8 | CC-3-V | 20.0 |
| 9 | CCGU-3-F | 3.0 |
| 10 | CCP-V-1 | 12.0 |
| 11 | CCP-V2-1 | 5.0 |
| 12 | APUQU-2-F | 9.5 |
| Σ | | 100.0 |

| Physical Properties | |
|---|---|
| T(N, I) = | 76.0° C. |
| $n_e$ (20° C., 589.3 nm) = | 1.5844 |
| Δn (20° C., 589.3 nm) = | 0.1004 |
| $\epsilon_\parallel$ (20° C., 1 kHz) = | 18.7 |
| Δε (20° C., 1 kHz) = | 14.3 |
| $\gamma_1$ (20° C.) = | 91 mPa·s |
| $k_1$ (20° C.) = | 10.5 pN |
| $k_3/k_1$ (20° C.) = | 1.16 |
| $V_0$ (20° C.) = | 0.90 V |

This mixture has a favorably low value of Δn, a high value of Δε and a low rotational viscosity. Thus it is very well suited for displays operating in the IPS mode.

Example 8

A liquid crystal mixture is realized with the composition and properties given in the following table.

| Composition Compound | | |
|---|---|---|
| No. | Abbreviation | Conc./% |
| 1 | PGU-2-F | 7.5 |
| 2 | CDU-2-F | 3.5 |
| 3 | PUQU-2-F | 9.0 |
| 4 | PUQU-3-F | 10.0 |
| 5 | CCP-3OCF3 | 8.0 |
| 6 | CCZU-3-F | 10.0 |
| 7 | CC-3-V | 25.0 |
| 8 | CCGU-3-F | 3.5 |
| 9 | CCP-V-1 | 15.0 |
| 10 | ADUQU-3-F | 8.5 |
| Σ | | 100.0 |

| Physical Properties | |
|---|---|
| T(N, I) = | 75.5° C. |
| $n_e$ (20° C., 589.3 nm) = | 1.5825 |
| Δn (20° C., 589.3 nm) = | 0.0995 |
| $\epsilon_\parallel$ (20° C., 1 kHz) = | 18.0 |
| Δε (20° C., 1 kHz) = | 13.7 |
| $\gamma_1$ (20° C.) = | 82 mPa·s |
| $k_1$ (20° C.) = | 10.9 pN |
| $k_3/k_1$ (20° C.) = | 1.17 |
| $V_0$ (20° C.) = | 0.94 V |

This mixture has a favorably low value of Δn, a high value of Δε and a low rotational viscosity. Thus it is very well suited for displays operating in the IPS mode.

Comparative Example 4

A liquid crystal mixture is realized with the composition and properties given in the following table.

| Composition Compound | | |
|---|---|---|
| No. | Abbreviation | Conc./% |
| 1 | PGU-2-F | 5.0 |
| 2 | PGU-3-F | 9.0 |
| 3 | PUQU-2-F | 7.0 |
| 4 | PUQU-3-F | 7.0 |
| 5 | CCP-3F.F.F | 4.0 |
| 6 | CCGU-3-F | 2.0 |
| 7 | CC-3-V1 | 16.0 |
| 8 | CC-4-V | 19.0 |
| 9 | CCP-V-1 | 12.0 |
| 10 | CCP-V2-1 | 14.0 |
| 11 | PP-1-2V1 | 5.0 |
| Σ | | 100.0 |

| Physical Properties | |
|---|---|
| T(N, I) = | 78.5° C. |
| $n_e$ (20° C., 589.3 nm) = | 1.6010 |
| Δn (20° C., 589.3 nm) = | 0.1100 |
| $\epsilon_\parallel$ (20° C., 1 kHz) = | 10.1 |
| Δε (20° C., 1 kHz) = | 7.0 |
| $\gamma_1$ (20° C.) = | 70 mPa·s |
| $k_1$ (20° C.) = | 14.0 pN |
| $k_3/k_1$ (20° C.) = | 0.93 |
| $V_0$ (20° C.) = | 1.49 V |

Example 9

A liquid crystal mixture is realized with the composition and properties given in the following table.

| Composition Compound | | |
|---|---|---|
| No. | Abbreviation | Conc./% |
| 1 | APUQU-2-F | 10.0 |
| 2 | APUQU-3-F | 10.0 |
| 3 | BCH-32 | 4.0 |
| 4 | CC-3-V | 50.0 |
| 5 | CC-3-V1 | 10.0 |
| 6 | PGP-2-3 | 8.0 |
| 7 | PGP-2-4 | 8.0 |
| Σ | | 100.0 |

| Physical Properties | |
|---|---|
| T(N, I) = | 74.5° C. |
| $n_e$ (20° C., 589.3 nm) = | 1.5914 |
| Δn (20° C., 589.3 nm) = | 0.1052 |
| $\epsilon_\parallel$ (20° C., 1 kHz) = | 8.0 |
| Δε (20° C., 1 kHz) = | 5.0 |
| $\gamma_1$ (20° C.) = | 52 mPa·s |
| $k_1$ (20° C.) = | 13.3 pN |
| $k_3$ (20° C.) = | 11.7 pN |
| $V_0$ (20° C.) = | 1.71 V |
| $v_{10}$ (20° C.) = | 1.83 V |

This mixture has a favorable value of Δn, a high value of Δε and a very low rotational viscosity. Thus it is very well suited for displays for monitor application operating e.g. in the TN mode.

Example 10

A liquid crystal mixture is realized with the composition and properties given in the following table.

| | Composition Compound | |
|---|---|---|
| No. | Abbreviation | Conc./% |
| 1 | APUQU-2-F | 10.0 |
| 2 | APUQU-3-F | 10.0 |
| 3 | CC-3-V | 45.0 |
| 4 | CC-3-V1 | 15.0 |
| 5 | PGP-2-3 | 10.0 |
| 6 | PGP-2-4 | 10.0 |
| Σ | | 100.0 |

| Physical Properties | |
|---|---|
| T(N, I) = | 75.5° C. |
| $n_e$ (20° C., 589.3 nm) = | 1.5963 |
| Δn (20° C., 589.3 nm) = | 0.1097 |
| ε∥ (20° C., 1 kHz) = | 8.0 |
| Δε (20° C., 1 kHz) = | 5.0 |
| $\gamma_1$ (20° C.) = | 54 mPa·s |
| $V_{10}$ (20° C.) = | 1.87 V |
| $V_{90}$ (20° C.) = | 2.71 V |

This mixture has a favorable value of Δn, a high value of Δε and a low rotational viscosity. Thus it is very well suited for displays for monitor application operating e.g. in the TN mode.

Example 11

A liquid crystal mixture is realized with the composition and properties given in the following table.

| | Composition Compound | |
|---|---|---|
| No. | Abbreviation | Conc./% |
| 1 | APUQU-2-F | 10.0 |
| 2 | APUQU-3-F | 10.0 |
| 3 | CC-3-V | 52.0 |
| 4 | CC-3-V1 | 10.0 |
| 5 | PGP-2-3 | 9.0 |
| 6 | PGP-2-4 | 9.0 |
| Σ | | 100.0 |

| Physical Properties | |
|---|---|
| T(N, I) = | 71.0° C. |
| $n_e$ (20° C., 589.3 nm) = | 1.5893 |
| Δn (20° C., 589.3 nm) = | 0.1037 |
| ε∥ (20° C., 1 kHz) = | 8.1 |
| Δε (20° C., 1 kHz) = | 5.1 |
| $\gamma_1$ (20° C.) = | 53 mPa·s |
| $k_1$ (20° C.) = | 12.9 pN |
| $k_3/k_1$ (20° C.) = | 0.89 |
| $V_0$ (20° C.) = | 1.68 V |

This mixture has a favorable value of Δn, a high value of Δε and a low rotational viscosity. Thus it is very well suited for displays for monitor application operating e.g. in the TN mode.

Example 12

A liquid crystal mixture is realized with the composition and properties given in the following table.

| | Composition Compound | |
|---|---|---|
| No. | Abbreviation | Conc./% |
| 1 | APUQU-2-F | 12.0 |
| 2 | APUQU-3-F | 12.0 |
| 3 | CC-3-V | 56.0 |
| 4 | PGP-2-3 | 10.0 |
| 5 | PGP-2-4 | 10.0 |
| Σ | | 100.0 |

| Physical Properties | |
|---|---|
| T(N, I) = | 72.0° C. |
| $n_e$ (20° C., 589.3 nm) = | 1.5978 |
| Δn (20° C., 589.3 nm) = | 0.1100 |
| ε∥ (20° C., 1 kHz) = | 9.5 |
| Δε (20° C., 1 kHz) = | 6.3 |
| $\gamma_1$ (20° C.) = | 55 mPa·s |
| $k_1$ (20° C.) = | 12.5 pN |
| $k_3/k_1$ (20° C.) = | 0.88 |
| $V_0$ (20° C.) = | 1.49 V |
| $V_{10}$ (20° C.) = | 1.60 V |
| $V_{90}$ (20° C.) = | 2.35 V |

This mixture has a favorable value of Δn, a high value of Δε and a low rotational viscosity. Thus it is very well suited for displays for monitor application operating e.g. in the TN mode.

Example 13

A liquid crystal mixture is realized with the composition and properties given in the following table.

| | Composition Compound | |
|---|---|---|
| No. | Abbreviation | Conc./% |
| 1 | CC-3-V | 40.0 |
| 2 | PUQU-2-F | 8.0 |
| 3 | PUQU-3-F | 6.0 |
| 4 | PGU-3-F | 6.0 |
| 5 | APUQU-2-F | 7.0 |
| 6 | CCP-2OCF3 | 9.0 |
| 7 | CCP-V-1 | 15.0 |
| 8 | PGP-2-4 | 2.0 |
| 9 | CCGU-3-F | 7.0 |
| Σ | | 100.0 |

| Physical Properties | |
|---|---|
| T(N, I) = | 75.0° C. |
| Δn (20° C., 589.3 nm) = | 0.0985 |
| ε∥ (20° C., 1 kHz) = | 11.2 |
| Δε (20° C., 1 kHz) = | 7.8 |
| $\gamma_1$ (20° C.) = | 61 mPa·s |

| Composition Compound | | |
|---|---|---|
| $V_{10}$ (20° C.) = | | 1.43 V |
| $V_{90}$ (20° C.) = | | 2.17 V |

This mixture has a favorably low value of Δn, a high value of Δε and a low rotational viscosity. Thus it is very well suited for displays operating in the TN mode.

Example 14

A liquid crystal mixture is realized with the composition and properties given in the following table.

| Composition Compound | | |
|---|---|---|
| No. | Abbreviation | Conc./% |
| 1 | CC-3-V | 41.0 |
| 2 | PP-1-2V1 | 5.0 |
| 3 | PUQU-2-F | 6.0 |
| 4 | PGU-3-F | 7.0 |
| 5 | APUQU-2-F | 7.0 |
| 6 | APUQU-3-F | 7.0 |
| 7 | CCP-2OCF3 | 9.0 |
| 8 | CCP-V-1 | 14.0 |
| 9 | CCGU-3-F | 4.0 |
| Σ | | 100.0 |
| Physical Properties | | |
| T(N, I) = | | 75.0° C. |
| Δn (20° C., 589.3 nm) = | | 0.1003 |
| ε∥ (20° C., 1 kHz) = | | 10.9 |
| Δε (20° C., 1 kHz) = | | 7.5 |
| $\gamma_1$ (20° C.) = | | 57 mPa·s |
| $V_{10}$ (20° C.) = | | 1.53 V |
| $V_{90}$ (20° C.) = | | 2.29 V |

This mixture has a favorable value of Δn, a high value of Δε and a low rotational viscosity. Thus it is very well suited for displays operating in the TN mode.

Example 15

A liquid crystal mixture is realized with the composition and properties given in the following table.

| Composition Compound | | |
|---|---|---|
| No. | Abbreviation | Conc./% |
| 1 | CC-3-V | 42.0 |
| 2 | CC-3-V1 | 3.5 |
| 3 | CCP-2OCF3 | 10.0 |
| 4 | PGP-2-4 | 1.0 |
| 5 | PUQU-2-F | 9.0 |
| 6 | PUQU-3-F | 11.0 |
| 7 | PGU-3-F | 7.0 |
| 8 | CCGU-3-F | 9.0 |
| 9 | CBC-33 | 4.5 |
| 10 | CBC-53 | 3.0 |
| Σ | | 100.0 |
| Physical Properties | | |
| T(N, I) = | | 75.5° C. |
| Δn (20° C., 589.3 nm) = | | 0.0996 |
| ε∥ (20° C., 1 kHz) = | | 11.3 |
| Δε (20° C., 1 kHz) = | | 7.9 |
| $\gamma_1$ (20° C.) = | | 66 mPa·s |
| $V_{10}$ (20° C.) = | | 1.49 V |
| $V_{90}$ (20° C.) = | | 2.23 V |

This mixture has a favorable value of Δn, a high value of Δε and a low rotational viscosity. Thus it is very well suited for displays operating in the TN mode.

Example 16

A liquid crystal mixture is realized with the composition and properties given in the following table.

| Composition Compound | | |
|---|---|---|
| No. | Abbreviation | Conc./% |
| 1 | CC-3-V | 39.0 |
| 2 | CC-3-V1 | 8.0 |
| 3 | CCP-2OCF3 | 10.0 |
| 4 | PUQU-2-F | 9.0 |
| 5 | PUQU-3-F | 11.0 |
| 6 | PGU-3-F | 7.0 |
| 7 | CCGU-3-F | 8.5 |
| 8 | CBC-33 | 4.0 |
| 9 | CBC-53 | 3.5 |
| Σ | | 100.0 |
| Physical Properties | | |
| T(N, I) = | | 74.5° C. |
| Δn (20° C., 589.3 nm) = | | 0.0974 |
| ε∥ (20° C., 1 kHz) = | | 11.1 |
| Δε (20° C., 1 kHz) = | | 7.7 |
| $\gamma_1$ (20° C.) = | | 64 mPa·s |
| $V_{10}$ (20° C.) = | | 1.47 V |
| $V_{90}$ (20° C.) = | | 2.23 V |

This mixture has a favorable low value of Δn, a high value of Δε and a low rotational viscosity. Thus it is very well suited for displays operating in the TN mode.

Example 17

A liquid crystal mixture is realized with the composition and properties given in the following table.

| Composition Compound | | |
|---|---|---|
| No. | Abbreviation | Conc./% |
| 1 | PUQU-3-F | 10.0 |
| 2 | CC-3-V1 | 16.0 |

-continued

| | Composition Compound | |
|---|---|---|
| 3 | CC-3-V | 29.0 |
| 4 | CCP-V-1 | 11.0 |
| 5 | CCGU-3-F | 8.0 |
| 6 | PGU-3-F | 8.0 |
| 7 | APUQU-2-F | 5.0 |
| 8 | APUQU-3-F | 5.0 |
| 9 | PGP-2-4 | 8.0 |
| Σ | | 100.0 |

| Physical Properties | |
|---|---|
| T(N, I) = | 82.0° C. |
| Δn (20° C., 589.3 nm) = | 0.1128 |
| $\epsilon_\parallel$ (20° C., 1 kHz) = | 11.3 |
| Δε (20° C., 1 kHz) = | 8.0 |
| $\gamma_1$ (20° C.) = | 70 mPa·s |
| $V_{10}$ (20° C.) = | 1.57 V |
| $V_{90}$ (20° C.) = | 2.32 V |

This mixture has a favorable value of Δn, a high value of Δ∈ and a low rotational viscosity. Thus it is very well suited for displays operating in the TN mode.

Example 18

A liquid crystal mixture is realized with the composition and properties given in the following table.

| | Composition Compound | |
|---|---|---|
| No. | Abbreviation | Conc./% |
| 1 | CC-3-V | 44.0 |
| 2 | CC-3-V1 | 8.0 |
| 3 | PP-1-2V1 | 3.0 |
| 4 | PGU-2-F | 4.0 |
| 5 | PGU-3-F | 7.0 |
| 6 | APUQU-2-F | 6.0 |
| 7 | APUQU-3-F | 5.0 |
| 8 | CCP-V-1 | 15.0 |
| 9 | BCH-32 | 4.0 |
| 10 | PGP-2-4 | 4.0 |
| Σ | | 100.0 |

| Physical Properties | |
|---|---|
| T(N, I) = | 76.0° C. |
| Δn (20° C., 589.3 nm) = | 0.1031 |
| $\epsilon_\parallel$ (20° C., 1 kHz) = | 7.6 |
| Δε (20° C., 1 kHz) = | 4.7 |
| $\gamma_1$ (20° C.) = | 50 mPa·s |
| $V_{10}$ (20° C.) = | 1.93 V |
| $V_{90}$ (20° C.) = | 2.86 V |

This mixture has a favorable value of Δn, a moderately high value of Δ∈ and a very low rotational viscosity. Thus it is very well suited for displays operating in the TN mode.

Example 19

A liquid crystal mixture is realized with the composition and properties given in the following table.

| | Composition Compound | |
|---|---|---|
| No. | Abbreviation | Conc./% |
| 1 | PUQU-2-F | 9.0 |
| 2 | PUQU-3-F | 10.0 |
| 3 | CC-3-V1 | 11.0 |
| 4 | CC-3-V | 24.0 |
| 5 | CCP-V-1 | 12.0 |
| 6 | CCP-V2-1 | 14.0 |
| 7 | CCGU-3-F | 7.0 |
| 8 | PP-1-2V1 | 6.0 |
| 9 | PGU-3-F | 7.0 |
| Σ | | 100.0 |

| Physical Properties | |
|---|---|
| T(N, I) = | 79.5° C. |
| Δn (20° C., 589.3 nm) = | 0.1089 |
| $\epsilon_\parallel$ (20° C., 1 kHz) = | 10.1 |
| Δε (20° C., 1 kHz) = | 7.0 |
| $\gamma_1$ (20° C.) = | 68 mPa·s |

This mixture has a favorable value of Δn, a high value of Δ∈ and a relatively low rotational viscosity. Thus it is very well suited for displays operating in the TN mode.

Example 20

A liquid crystal mixture is realized with the composition and properties given in the following table.

| | Composition Compound | |
|---|---|---|
| No. | Abbreviation | Conc./% |
| 1 | GGP-3-CL | 7.0 |
| 2 | GGP-5-CL | 3.0 |
| 3 | PGU-2-F | 5.0 |
| 4 | PGU-3-F | 5.0 |
| 5 | PUQU-2-F | 4.0 |
| 6 | PUQU-3-F | 38.0 |
| 7 | CCP-V-1 | 12.0 |
| 8 | CCP-V2-1 | 6.0 |
| 9 | CC-3-V1 | 8.0 |
| 10 | PGP-2-3 | 6.0 |
| 11 | PGP-2-4 | 6.0 |
| 12 | CC-3-V | 31.0 |
| 13 | PCH-3CL | 3.0 |
| Σ | | 100.0 |

| Physical Properties | |
|---|---|
| T(N, I) = | 75.2° C. |
| $n_e$ (20° C., 589.3 nm) = | 1.6226 |
| Δn (20° C., 589.3 nm) = | 0.1262 |
| $\epsilon_\parallel$ (20° C., 1 kHz) = | 7.6 |
| Δε (20° C., 1 kHz) = | 4.5 |
| $\gamma_1$ (20° C.) = | 62 mPa·s |
| $V_{10}$ (20° C.) = | 1.95 V |
| $V_{90}$ (20° C.) = | 2.87 V |

This mixture has a favorable value of Δn, a moderately high value of Δ∈ and a rather low rotational viscosity. Thus it is very well suited for displays operating in the TN mode.

Example 21

A liquid crystal mixture is realized with the composition and properties given in the following table.

| Composition Compound | | |
|---|---|---|
| No. | Abbreviation | Conc./% |
| 1 | GGP-3-CL | 7.0 |
| 2 | GGP-5-CL | 5.5 |
| 3 | PGU-2-F | 5.0 |
| 4 | PGU-3-F | 5.0 |
| 5 | PUQU-2-F | 4.0 |
| 6 | PUQU-3-F | 3.0 |
| 7 | CCP-V2-1 | 9.5 |
| 8 | CBC-33 | 3.0 |
| 9 | CC-3-V1 | 1.5 |
| 10 | PGP-2-3 | 6.0 |
| 11 | PGP-2-4 | 6.0 |
| 12 | CC-3-V | 44.5 |
| Σ | | 100.0 |

| Physical Properties | |
|---|---|
| $T(N, I) =$ | 75.5° C. |
| $n_e$ (20° C., 589.3 nm) = | 1.6233 |
| $\Delta n$ (20° C., 589.3 nm) = | 0.1262 |
| $\epsilon_{\parallel}$ (20° C., 1 kHz) = | 7.8 |
| $\Delta\epsilon$ (20° C., 1 kHz) = | 4.7 |
| $\gamma_1$ (20° C.) = | 62 mPa·s |
| $V_{10}$ (20° C.) = | 1.92 V |
| $V_{90}$ (20° C.) = | 2.83 V |

This mixture has a favorable value of $\Delta n$, a moderately high value of $\Delta\epsilon$ and a rather low rotational viscosity. Thus it is very well suited for displays operating in the TN mode.

Example 22

A liquid crystal mixture is realized with the composition and properties given in the following table.

| Composition Compound | | |
|---|---|---|
| No. | Abbreviation | Conc./% |
| 1 | GGP-3-CL | 7.0 |
| 2 | GGP-5-CL | 4.0 |
| 3 | CCQU-5-F | 2.0 |
| 4 | PUQU-2-F | 5.0 |
| 5 | PUQU-3-F | 10.0 |
| 6 | CCP-V-1 | 8.0 |
| 7 | CCP-V2-1 | 12.0 |
| 8 | CC-3-V1 | 4.0 |
| 9 | PP-1-2V1 | 5.0 |
| 10 | PGP-2-3 | 6.0 |
| 11 | PGP-2-4 | 6.0 |
| 12 | CC-3-V | 31.0 |
| Σ | | 100.0 |

| Physical Properties | |
|---|---|
| $T(N, I) =$ | 75.6° C. |
| $n_e$ (20° C., 589.3 nm) = | 1.6233 |
| $\Delta n$ (20° C., 589.3 nm) = | 0.1262 |
| $\epsilon_{\parallel}$ (20° C., 1 kHz) = | 7.8 |
| $\Delta\epsilon$ (20° C., 1 kHz) = | 4.7 |
| $\gamma_1$ (20° C.) = | 68 mPa·s |
| $V_{10}$ (20° C.) = | 1.94 V |
| $V_{90}$ (20° C.) = | 2.85 V |

This mixture has a favorable value of $\Delta n$, a moderately high value of $\Delta\epsilon$ and a relatively low rotational viscosity. Thus it is very well suited for displays operating in the TN mode.

Example 23

A liquid crystal mixture is realized with the composition and properties given in the following table.

| Composition Compound | | |
|---|---|---|
| No. | Abbreviation | Conc./% |
| 1 | BCH-3F.F.F | 15.0 |
| 2 | GGP-3-CL | 7.0 |
| 3 | GGP-5-CL | 7.0 |
| 4 | BCH-3F.F | 3.0 |
| 5 | CCQU-3-F | 3.0 |
| 6 | CCQU-5-F | 8.0 |
| 7 | CCP-V2-1 | 1.5 |
| 8 | CC-3-V1 | 7.0 |
| 9 | PP-1-2V1 | 5.0 |
| 10 | PGP-2-3 | 6.0 |
| 11 | PGP-2-4 | 6.0 |
| 12 | CC-3-V | 31.5 |
| Σ | | 100.0 |

| Physical Properties | |
|---|---|
| $T(N, I) =$ | 74.6° C. |
| $n_e$ (20° C., 589.3 nm) = | 1.6206 |
| $\Delta n$ (20° C., 589.3 nm) = | 0.1270 |
| $\epsilon_{\parallel}$ (20° C., 1 kHz) = | 7.7 |
| $\Delta\epsilon$ (20° C., 1 kHz) = | 4.6 |
| $\gamma_1$ (20° C.) = | 69 mPa·s |
| $V_{10}$ (20° C.) = | 1.96 V |
| $V_{90}$ (20° C.) = | 2.86 V |

This mixture has a favorable value of $\Delta n$, a moderately high value of $\Delta\epsilon$ and a relatively low rotational viscosity. Thus it is very well suited for displays operating in the TN mode.

Example 24

A liquid crystal mixture is realized with the composition and properties given in the following table.

| Composition Compound | | |
|---|---|---|
| No. | Abbreviation | Conc./% |
| 1 | CCQU-3-F | 7.0 |
| 2 | PGU-2-F | 7.0 |
| 3 | PGU-3-F | 6.0 |
| 4 | PUQU-2-F | 6.0 |
| 5 | PUQU-3-F | 12.0 |

-continued

| | Composition Compound | |
|---|---|---|
| 6 | CCP-V-1 | 10.5 |
| 7 | CCP-V2-1 | 8.0 |
| 8 | CCPC-33 | 3.5 |
| 9 | CC-3-V1 | 10.0 |
| 10 | CC-3-V | 30.0 |
| Σ | | 100.0 |

| Physical Properties | |
|---|---|
| T(N, I) = | 74.8° C. |
| $n_e$ (20° C., 589.3 nm) = | 1.5858 |
| Δn (20° C., 589.3 nm) = | 0.1004 |
| $\epsilon_\parallel$ (20° C., 1 kHz) = | 11.0 |
| Δε (20° C., 1 kHz) = | 7.7 |
| $\gamma_1$ (20° C.) = | 62 mPa·s |
| $V_{10}$ (20° C.) = | 1.52 V |
| $V_{90}$ (20° C.) = | 2.28 V |

This mixture has a favorable value of Δn, a relatively high value of Δε and a rather low rotational viscosity. Thus it is very well suited for displays operating in the TN mode.

Example 25

A liquid crystal mixture is realized with the composition and properties given in the following table.

| | Composition Compound | |
|---|---|---|
| No. | Abbreviation | Conc./% |
| 1 | CCP-3F.F.F | 6.0 |
| 2 | CCP-3OCF3 | 4.0 |
| 3 | PGU-3-F | 6.0 |
| 4 | PUQU-2-F | 5.0 |
| 5 | PUQU-3-F | 7.0 |
| 6 | CCP-V-1 | 12.0 |
| 7 | CCP-V2-1 | 10.5 |
| 8 | CC-3-V1 | 8.0 |
| 9 | CC-4-V | 7.0 |
| 10 | CC-3-V | 23.5 |
| 11 | PGP-2-4 | 5.0 |
| 12 | PCH-301 | 6.0 |
| Σ | | 100.0 |

| Physical Properties | |
|---|---|
| T(N, I) = | 75.0° C. |
| $n_e$ (20° C., 589.3 nm) = | 1.5836 |
| Δn (20° C., 589.3 nm) = | 0.0964 |
| $\epsilon_\parallel$ (20° C., 1 kHz) = | 7.4 |
| Δε (20° C., 1 kHz) = | 4.4 |
| $\gamma_1$ (20° C.) = | 53 mPa·s |
| $V_{10}$ (20° C.) = | 1.91 V |
| $V_{90}$ (20° C.) = | 2.81 V |

This mixture has a favorably low value of Δn, a moderately high value of Δε and a very low rotational viscosity. Thus it is very well suited for displays operating in the TN mode.

Example 26

A liquid crystal mixture is realized with the composition and properties given in the following table.

| | Composition Compound | |
|---|---|---|
| No. | Abbreviation | Conc./% |
| 1 | CDU-2-F | 3.0 |
| 2 | PGU-3-F | 9.0 |
| 3 | CC-3-V | 31.0 |
| 4 | CC-3-V1 | 14.0 |
| 5 | CCP-V-1 | 13.0 |
| 6 | CCP-V2-1 | 14.0 |
| 7 | PUQU-2-F | 8.0 |
| 8 | PUQU-3-F | 8.0 |
| Σ | | 100.0 |

| Physical Properties | |
|---|---|
| T(N, I) = | 74.0° C. |
| $n_e$ (20° C., 589.3 nm) = | 1.5809 |
| Δn (20° C., 589.3 nm) = | 0.0943 |
| $\epsilon_\parallel$ (20° C., 1 kHz) = | 9.0 |
| Δε (20° C., 1 kHz) = | 5.8 |
| $\gamma_1$ (20° C.) = | 52 mPa·s |

This mixture has a favorably low value of Δn, a moderately high value of Δε and a very low rotational viscosity. Thus it is very well suited for displays operating in the TN mode.

Example 27

A liquid crystal mixture is realized with the composition and properties given in the following table.

| | Composition Compound | |
|---|---|---|
| No. | Abbreviation | Conc./% |
| 1 | CC-3-V | 38.0 |
| 2 | ACQU-3-F | 5.0 |
| 3 | CCGU-3-F | 10.0 |
| 4 | PUQU-3-F | 11.0 |
| 5 | APUQU-3-F | 8.0 |
| 6 | CCP-V-1 | 18.0 |
| 7 | PP-1-2V1 | 10.0 |
| Σ | | 100.0 |

| Physical Properties | |
|---|---|
| T(N, I) = | 76.0° C. |
| $n_e$ (20° C., 589.3 nm) = | 1.5882 |
| Δn (20° C., 589.3 nm) = | 0.1016 |
| $\epsilon_\parallel$ (20° C., 1 kHz) = | 10.2 |
| Δε (20° C., 1 kHz) = | 7.0 |
| $\gamma_1$ (20° C.) = | 64 mPa·s |
| $V_{10}$ (20° C.) = | 1.63 V |
| $V_{90}$ (20° C.) = | 2.44 V |

This mixture has a favorably low value of Δn, a relatively high value of Δε and a low rotational viscosity. Thus it is very well suited for displays operating in the TN mode.

Example 28

A liquid crystal mixture is realized with the composition and properties given in the following table.

| Composition Compound | | |
|---|---|---|
| No. | Abbreviation | Conc./% |
| 1 | PUQU-2-F | 5.0 |
| 2 | PUQU-3-F | 8.0 |
| 3 | CC-3-V | 31.0 |
| 4 | CCP-V-1 | 14.0 |
| 5 | CCP-V2-1 | 8.0 |
| 6 | CVCP-1V-OT | 12.0 |
| 7 | PP-1-2V1 | 14.0 |
| 8 | ACQU-2-F | 4.0 |
| 9 | ACQU-3-F | 4.0 |
| Σ | | 100.0 |

| Physical Properties | |
|---|---|
| $T(N, I)$ = | 73.1° C. |
| $n_e$ (20° C., 589.3 nm) = | 1.5877 |
| $\Delta n$ (20° C., 589.3 nm) = | 0.1012 |
| $\epsilon_\parallel$ (20° C., 1 kHz) = | 7.7 |
| $\Delta\epsilon$ (20° C., 1 kHz) = | 4.8 |
| $\gamma_1$ (20° C.) = | 57 mPa·s |
| $k_1$ (20° C.) = | 12.9 pN |
| $k_3/k_1$ (20° C.) = | 1.10 |
| $V_0$ (20° C.) = | 1.72 V |

This mixture has a favorably low value of Δn, a moderately high value of Δ∈ and a very low rotational viscosity. Thus it is very well suited for displays operating in the TN mode.

Example 29

A liquid crystal mixture is realized with the composition and properties given in the following table.

| Composition Compound | | |
|---|---|---|
| No. | Abbreviation | Conc./% |
| 1 | ACQU-2-F | 11.0 |
| 2 | ACQU-3-F | 12.0 |
| 3 | CC-3-V | 43.0 |
| 4 | CCGU-3-F | 10.0 |
| 5 | PGP-2-3 | 8.0 |
| 6 | PGP-2-4 | 9.0 |
| 7 | PP-1-2V1 | 7.0 |
| Σ | | 100.0 |

| Physical Properties | |
|---|---|
| $T(N, I)$ = | 71.5° C. |
| $n_e$ (20° C., 589.3 nm) = | 1.5906 |
| $\Delta n$ (20° C., 589.3 nm) = | 0.1054 |
| $\epsilon_\parallel$ (20° C., 1 kHz) = | 7.8 |
| $\Delta\epsilon$ (20° C., 1 kHz) = | 4.6 |
| $\gamma_1$ (20° C.) = | 60 mPa·s |
| $k_1$ (20° C.) = | 13.0 pN |
| $k_3/k_1$ (20° C.) = | 0.86 |
| $V_0$ (20° C.) = | 1.77 V |

This mixture has a favorably low value of Δn, a moderately high value of Δ∈ and a very low rotational viscosity. Thus it is very well suited for displays operating in the TN mode.

Example 30

A liquid crystal mixture is realized with the composition and properties given in the following table.

| Composition Compound | | |
|---|---|---|
| No. | Abbreviation | Conc./% |
| 1 | ACQU-3-F | 6.0 |
| 2 | CC-3-V | 36.0 |
| 3 | PUQU-2-F | 5.0 |
| 4 | PUQU-3-F | 4.0 |
| 5 | CCP-V-1 | 20.0 |
| 6 | PP-1-2V1 | 3.0 |
| 7 | PGP-2-4 | 3.0 |
| 7 | APUQU-2-F | 10.0 |
| 7 | APUQU-3-F | 9.0 |
| 7 | BCH-32 | 4.0 |
| Σ | | 100.0 |

| Physical Properties | |
|---|---|
| $T(N, I)$ = | 81.0° C. |
| $n_e$ (20° C., 589.3 nm) = | 1.5908 |
| $\Delta n$ (20° C., 589.3 nm) = | 0.1040 |
| $\epsilon_\parallel$ (20° C., 1 kHz) = | 11.9 |
| $\Delta\epsilon$ (20° C., 1 kHz) = | 8.5 |
| $\gamma_1$ (20° C.) = | 65 mPa·s |
| $V_{10}$ (20° C.) = | 1.47 V |
| $V_{90}$ (20° C.) = | 2.23 V |

This mixture has a favorably low value of Δn, a relatively high value of Δ∈ and a low rotational viscosity. Thus it is very well suited for displays operating in the TN mode.

Example 31

A liquid crystal mixture is realized with the composition given in the following table.

| Composition Compound | | |
|---|---|---|
| No. | Abbreviation | Conc./% |
| 1 | PGU-2-F | 10.0 |
| 2 | CCQU-3-F | 2.0 |
| 3 | CCZU-3-F | 13.0 |
| 4 | PUQU-3-F | 23.0 |
| 5 | CC-3-V | 32.5 |
| 6 | CCP-V-1 | 5.0 |
| 7 | CCP-V2-1 | 12.0 |
| 8 | CCPC-33 | 2.5 |
| Σ | | 100.0 |

Example 32

A liquid crystal mixture is realized with the composition and properties given in the following table.

| Composition Compound | | |
|---|---|---|
| No. | Abbreviation | Conc./% |
| 1 | PGU-2-F | 10.0 |
| 2 | CCQU-3-F | 2.0 |
| 3 | CCZU-3-F | 13.0 |
| 4 | PUQU-3-F | 23.0 |
| 5 | CC-3-V | 22.5 |
| 6 | CC-3-V1 | 10.0 |
| 7 | CCP-V-1 | 5.0 |
| 8 | CCP-V2-1 | 12.0 |
| 9 | CCPC-33 | 2.5 |
| Σ | | 100.0 |
| Physical Properties | | |
| $T(N, I)$ = | | 75.8° C. |
| $n_e$ (20° C., 589.3 nm) = | | 1.5859 |
| $\Delta n$ (20° C., 589.3 nm) = | | 0.1017 |
| $\epsilon_\parallel$ (20° C., 1 kHz) = | | 13.8 |
| $\Delta\epsilon$ (20° C., 1 kHz) = | | 10.1 |
| $\gamma_1$ (20° C.) = | | 75 mPa·s |

This mixture has a favorably low value of Δn, a high value of Δ∈ and a low rotational viscosity. Thus it is very well suited for displays operating in the TN or in the IPS mode.

Example 33

A liquid crystal mixture is realized with the composition and properties given in the following table.

| Composition Compound | | |
|---|---|---|
| No. | Abbreviation | Conc./% |
| 1 | PGU-3-F | 7.5 |
| 2 | PUQU-3-F | 20.0 |
| 3 | CC-3-V | 30.0 |
| 4 | CCP-V-1 | 6.0 |
| 5 | CCP-V2-1 | 15.0 |
| 6 | ACQU-2-F | 8.0 |
| 7 | ACQU-3-F | 7.0 |
| 8 | BCH-32 | 4.0 |
| 9 | CBC-33 | 2.5 |
| Σ | | 100.0 |
| Physical Properties | | |
| $T(N, I)$ = | | 75.1° C. |
| $n_e$ (20° C., 589.3 nm) = | | 1.5852 |
| $\Delta n$ (20° C., 589.3 nm) = | | 0.1014 |
| $\epsilon_\parallel$ (20° C., 1 kHz) = | | 12.6 |
| $\Delta\epsilon$ (20° C., 1 kHz) = | | 9.0 |
| $\gamma_1$ (20° C.) = | | 73 mPa·s |

This mixture has a favorably low value of Δn, a high value of Δ∈ and a low rotational viscosity. Thus it is very well suited for displays operating in the TN or in the IPS mode.

Example 34

A liquid crystal mixture is realized with the composition and properties given in the following table.

| Composition Compound | | |
|---|---|---|
| No. | Abbreviation | Conc./% |
| 1 | GGP-2-F | 5.5 |
| 2 | GGP-3-F | 6.0 |
| 3 | CC-3-V | 32.0 |
| 4 | CC-3-V1 | 4.5 |
| 5 | CCP-V-1 | 20.5 |
| 6 | PGP-2-3 | 5.0 |
| 7 | PGP-2-4 | 6.0 |
| 8 | PGP-2-5 | 6.0 |
| 9 | PUQU-3-F | 14.5 |
| Σ | | 100.0 |
| Physical Properties | | |
| $T(N, I)$ = | | 75.0° C. |
| $n_e$ (20° C., 589.3 nm) = | | 1.6224 |
| $\Delta n$ (20° C., 589.3 nm) = | | 0.1254 |
| $\epsilon_\parallel$ (20° C., 1 kHz) = | | 7.6 |
| $\Delta\epsilon$ (20° C., 1 kHz) = | | 4.4 |
| $\gamma_1$ (20° C.) = | | 63 mPa·s |
| $V_{10}$ (20° C.) = | | 1.96 V |
| $V_{90}$ (20° C.) = | | 2.90 V |

This mixture has a favorable value of Δn, a moderately high value of Δ∈ and a rather low rotational viscosity. Thus it is very well suited for displays operating in the TN mode.

Example 35

A liquid crystal mixture is realized with the composition and properties given in the following table.

| Composition Compound | | |
|---|---|---|
| No. | Abbreviation | Conc./% |
| 1 | GGP-2-F | 10.0 |
| 2 | CC-3-V | 32.0 |
| 3 | CC-3-V1 | 5.0 |
| 4 | CCP-V-1 | 21.0 |
| 5 | PGP-2-3 | 6.0 |
| 6 | PGP-2-4 | 6.0 |
| 7 | PGP-2-5 | 6.0 |
| 8 | PUQU-3-F | 14.0 |
| Σ | | 100.0 |
| Physical Properties | | |
| $T(N, I)$ = | | 75.5° C. |
| $n_e$ (20° C., 589.3 nm) = | | 1.6218 |
| $\Delta n$ (20° C., 589.3 nm) = | | 0.1248 |
| $\epsilon_\parallel$ (20° C., 1 kHz) = | | 7.3 |
| $\Delta\epsilon$ (20° C., 1 kHz) = | | 4.1 |
| $\gamma_1$ (20° C.) = | | 61 mPa·s |
| $k_1$ (20° C.) = | | 12.2 pN |
| $k_3/k_1$ (20° C.) = | | 1.08 |
| $V_0$ (20° C.) = | | 1.81 V |
| $V_{10}$ (20° C.) = | | 2.03 V |
| $V_{90}$ (20° C.) = | | 3.00 V |

This mixture has a favorable value of Δn, a moderately high value of Δε and a rather low rotational viscosity. Thus it is very well suited for displays operating in the TN mode.

Example 36

A liquid crystal mixture is realized with the composition and properties given in the following table.

| Composition Compound | | |
|---|---|---|
| No. | Abbreviation | Conc./% |
| 1 | APUQU-2-F | 10.0 |
| 2 | APUQU-3-F | 10.0 |
| 3 | CC-3-V | 54.0 |
| 4 | PGP-2-3 | 7.0 |
| 5 | PGP-2-4 | 7.0 |
| 6 | CCGU-3-F | 7.0 |
| 7 | PP-1-2V1 | 5.0 |
| Σ | | 100.0 |

| Physical Properties | |
|---|---|
| T(N, I) = | 73.5° C. |
| $n_e$ (20° C., 589.3 nm) = | 1.5960 |
| Δn (20° C., 589.3 nm) = | 0.1084 |
| $\epsilon_\parallel$ (20° C., 1 kHz) = | 9.2 |
| Δε (20° C., 1 kHz) = | 6.1 |
| $\gamma_1$ (20° C.) = | 57 mPa·s |
| $k_1$ (20° C.) = | 12.8 pN |
| $k_3/k_1$ (20° C.) = | 0.91 |
| $V_0$ (20° C.) = | 1.53 V |
| $V_{10}$ (20° C.) = | 1.70 V |
| $V_{90}$ (20° C.) = | 2.49 V |

This mixture has a favorable value of Δn, a moderately high value of Δε and a rather low rotational viscosity. Thus it is very well suited for displays operating in the TN mode.

Example 37

A liquid crystal mixture is realized with the composition and properties given in the following table.

| Composition Compound | | |
|---|---|---|
| No. | Abbreviation | Conc./% |
| 1 | PUQU-3-F | 10.0 |
| 2 | PGU-2-F | 9.0 |
| 3 | PGU-3-F | 9.0 |
| 4 | CC-3-V | 30.0 |
| 5 | CCP-V-1 | 16.0 |
| 6 | CCP-V2-1 | 4.0 |
| 7 | CPGP-4-3 | 5.0 |
| 8 | CPGP-5-2 | 5.0 |
| 9 | CPGP-5-3 | 4.0 |
| 10 | PGP-2-3 | 4.0 |
| 11 | PGP-2-4 | 4.0 |
| Σ | | 100.0 |

| Physical Properties | |
|---|---|
| T(N, I) = | 101.5° C. |
| $n_e$ (20° C., 589.3 nm) = | 1.6439 |
| Δn (20° C., 589.3 nm) = | 0.1442 |
| $\epsilon_\parallel$ (20° C., 1 kHz) = | 9.5 |
| Δε (20° C., 1 kHz) = | 6.3 |

| -continued | |
|---|---|
| Composition Compound | |
| $\gamma_1$ (20° C.) = | 98 mPa·s |
| $k_1$ (20° C.) = | 15.5 pN |
| $k_3/k_1$ (20° C.) = | 0.97 |
| $V_0$ (20° C.) = | 1.65 V |

This mixture has high claering point, a rather high value of Δn, a moderately high value of Δε and a relatively low rotational viscosity. Thus it is very well suited for displays operating in the TN mode.

Example 38

A liquid crystal mixture is realized with the composition and properties given in the following table.

| Composition Compound | | |
|---|---|---|
| No. | Abbreviation | Conc./% |
| 1 | PUQU-3-F | 12.0 |
| 2 | PGU-2-F | 8.0 |
| 3 | PGU-3-F | 8.0 |
| 4 | CC-3-V | 35.0 |
| 5 | CCP-V-1 | 12.0 |
| 6 | PGP-2-3 | 5.0 |
| 7 | CPGP-3-3 | 5.0 |
| 8 | CPGP-4-3 | 8.0 |
| 9 | CPGP-5-2 | 7.0 |
| Σ | | 100.0 |

| Physical Properties | |
|---|---|
| T(N, I) = | 102.0° C. |
| $n_e$ (20° C., 589.3 nm) = | 1.6410 |
| Δn (20° C., 589.3 nm) = | 0.1435 |
| $\epsilon_\parallel$ (20° C., 1 kHz) = | 9.5 |
| Δε (20° C., 1 kHz) = | 6.3 |
| $\gamma_1$ (20° C.) = | 99 mPa·s |

This mixture has high claering point, a rather high value of Δn, a moderately high value of Δε and a relatively low rotational viscosity. Thus it is very well suited for displays operating in the TN mode.

The entire disclosures of all applications, patents and publications, cited herein and of corresponding European application Nos. 05011326.5, filed May 25, 2005 and 05022352.8 filed Oct. 13, 2005, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal medium, comprising:
a dielectrically neutral component, component A, comprising a dielectrically neutral compound of formula I

I

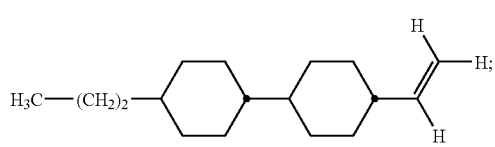

a dielectrically positive component, component B, comprising one or more dielectrically positive compounds having a dielectric anisotropy of more than 3, which includes one or more compounds selected from the group of compounds of formulae II-1a to II-1e:

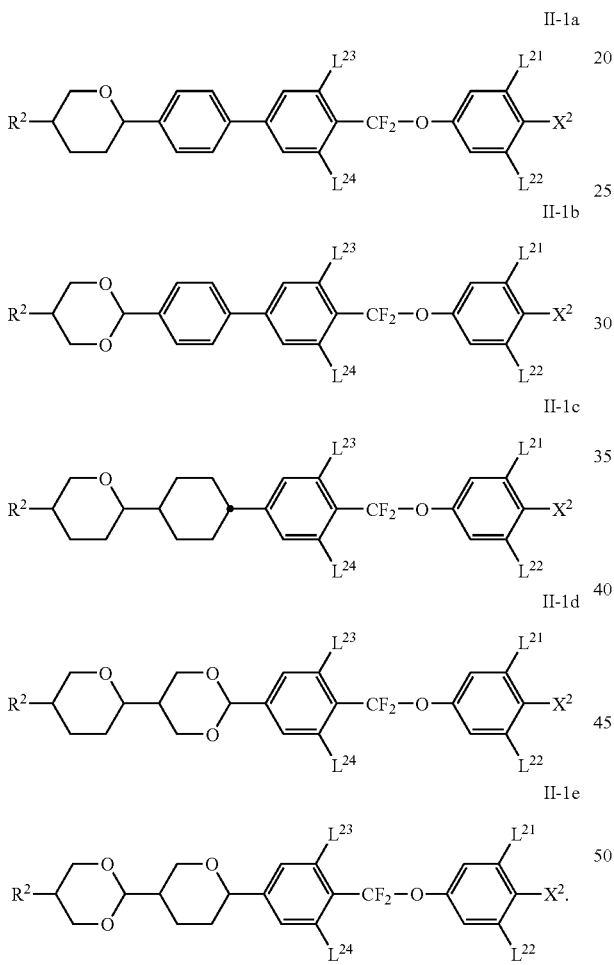

wherein
R² is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,
$L^{21}$ to $L^{24}$, are, independently of each other, H or F, and
X² is halogen, halogenated alkyl or halogenated alkoxy with 1 to 3 C-atoms or halogenated alkenyl or halogenated alkenyloxy with 2 or 3 C-atoms; and;
one or more compounds of formula VI:

VI

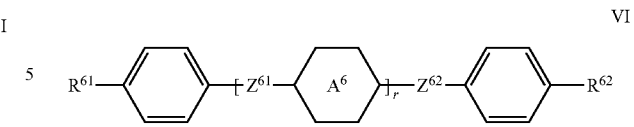

wherein
$R^{61}$ and $R^{62}$, are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

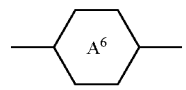

and in case it is occurring twice in each occurrence independently of each other, is

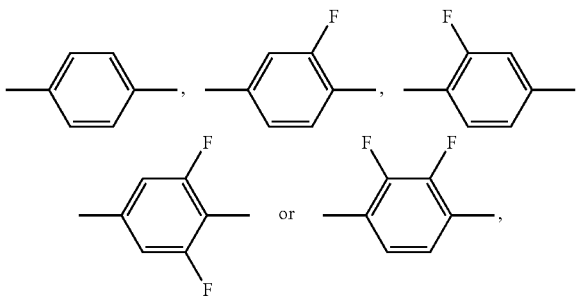

$Z^{61}$ and $Z^{62}$ are, independently of each other, and in case $Z^{61}$ is present twice, also these independently of each other, —CH₂CH₂—, —COO—, trans- —CH=CH—, trans- —CF=CF—, —CH₂O—, —CF₂O— or a single bond, and
r is 0, 1 or 2;
wherein the concentration of the component A in the medium is from 30% to 65% by weight of the total medium.

2. The liquid crystal medium of claim 1, wherein the concentration of the component A in the medium is from 33% to 59% by weight of the total medium.

3. The liquid crystal medium of claim 1, which further comprises one or more dielectrically neutral compounds of formula IV

IV

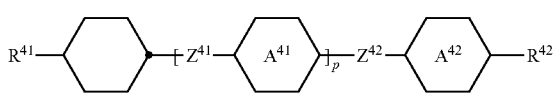

wherein
compounds of formula I are excluded from formula IV,
$R^{41}$ and $R^{42}$, are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

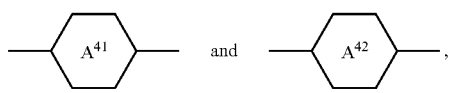 and independently of each other, and in case

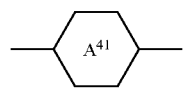

is present twice, also these, independently of each other, are

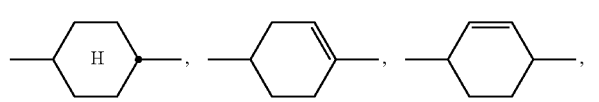

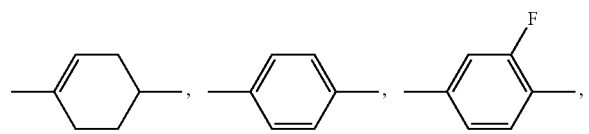 or

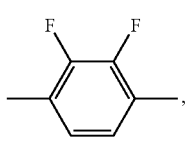, $Z^{41}$ and $Z^{42}$ are, independently of each other, and in case $Z^{41}$ is present twice, also these independently of each other, —CH$_2$CH$_2$—, —COO—, trans- —CH=CH—, trans- —CF=CF—, —CH$_2$O—, —CF$_2$O— or a single bond, and p is 0, 1 or 2.

4. The liquid crystal medium of claim 2, which further comprises one or more dielectrically neutral compounds of formula IV

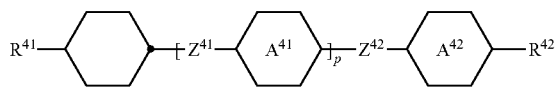
IV wherein
compounds of formula I are excluded from formula IV,
$R^{41}$ and $R^{42}$, are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

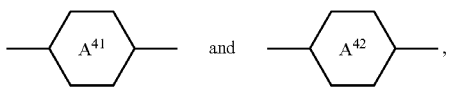 and independently of each other, and in case

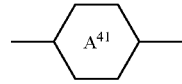

is present twice, also these, independently of each other, are

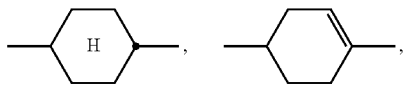

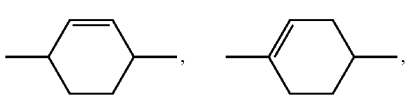

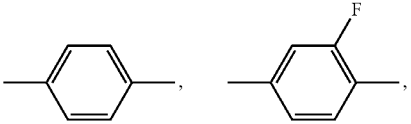

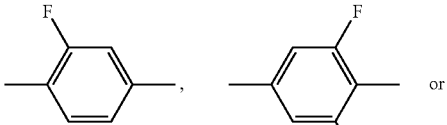 or

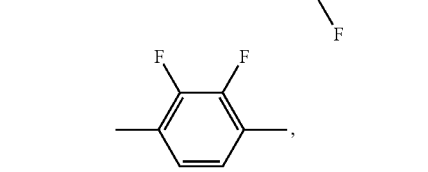, $Z^{41}$ and $Z^{42}$ are, independently of each other, and in case $Z^{41}$ is present twice, also these independently of each other, —CH$_2$CH$_2$—, —COO—, trans- —CH=CH—, trans- —CF=CF—, —CH$_2$O—, —CF$_2$O— or a single bond, and p is 0, 1 or 2.

5. The liquid crystal medium of claim 1, which further comprises one or more dielectrically positive compounds of formula V:

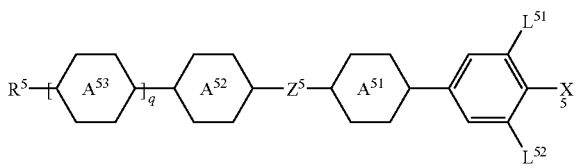
V wherein
R⁵ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

to

are, independently of each other,

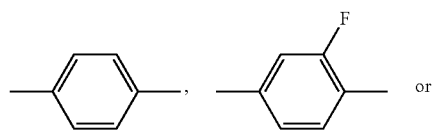

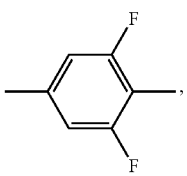

L⁵¹ and L⁵², are, independently of each other, H or F,

X⁵ is halogen, halogenated alkyl or halogenated alkoxy with 1 to 3 C-atoms or halogenated alkenyl or halogenated alkenyloxy with 2 or 3 C-atoms, Z⁵ is —CH₂CH₂—, —CF₂CF₂—, —COO—, trans- —CH=CH—, trans- —CF=CF— or —CH₂O—, and q is 0 or 1.

6. The liquid crystal medium of claim 2, which further comprises one or more dielectrically positive compounds of formula V:

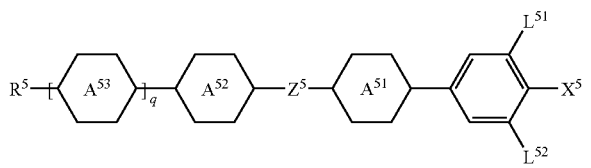

wherein
R⁵ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, to are, independently of each other,

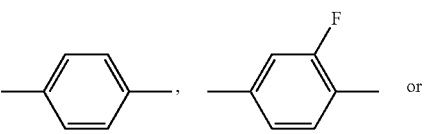

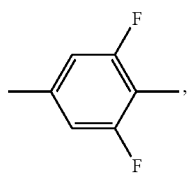

L⁵¹ and L⁵², are, independently of each other, H or F,

X⁵ is halogen, halogenated alkyl or halogenated alkoxy with 1 to 3 C-atoms or halogenated alkenyl or halogenated alkenyloxy with 2 or 3 C-atoms, Z⁵ is —CH₂CH₂—, —CF₂CF₂—, —COO—, trans- —CH=CH—, trans- —CF=CF— or —CH₂O—, and q is 0 or 1.

7. The liquid crystal medium of claim 3, which further comprises one or more dielectrically positive compounds of formula V:

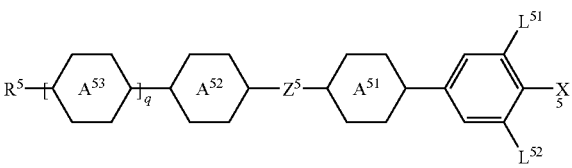

wherein

R⁵ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

to

are, independently of each other,

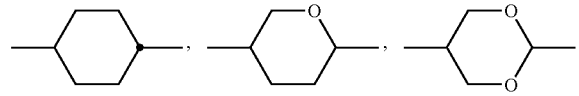

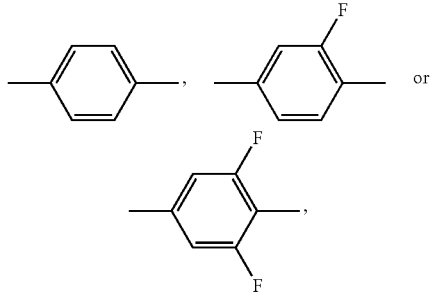

L⁵¹ and L⁵², are, independently of each other, H or F,

X⁵ is halogen, halogenated alkyl or halogenated alkoxy with 1 to 3 C-atoms or halogenated alkenyl or halogenated alkenyloxy with 2 or 3 C-atoms, Z⁵ is —CH₂CH₂—, —CF₂CF₂—, —COO—, trans- —CH═CH—, trans- —CF═CF— or —CH₂O—, and q is 0 or 1.

8. A liquid crystal display comprising a liquid crystal medium according to claim 1.

9. A liquid crystal display of claim 8, wherein the display is addressed by an active matrix.

10. A liquid crystal display comprising a liquid crystal medium according to claim 2.

11. A liquid crystal display of claim 10, wherein the display is addressed by an active matrix.

12. A liquid crystal display comprising a liquid crystal medium according to claim 3.

13. A liquid crystal display of claim 12, wherein the display is addressed by an active matrix.

14. A liquid crystal display comprising a liquid crystal medium according to claim 5.

15. A liquid crystal display of claim 14, wherein the display is addressed by an active matrix.

16. The liquid crystal medium of claim 1, which comprises one or more compounds of the formula VI wherein R⁶¹ is alkyl, R⁶² is alkyl or alkenyl,

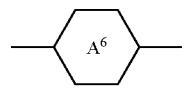

and in case it is occurring twice in each occurrence independently of each other, is

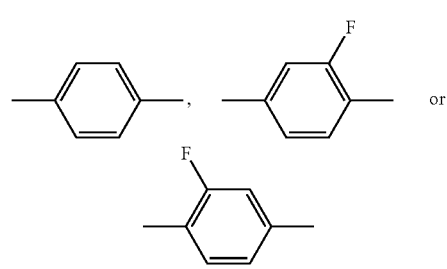

Z⁶¹ and Z⁶² are each a single bond, and r is 0 or 1.

17. The liquid crystal medium of claim 2, which comprises one or more compounds of the formula VI wherein R⁶¹ is alkyl, R⁶² is alkyl or alkenyl,

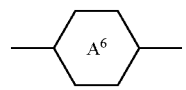

and in case it is occurring twice in each occurrence independently of each other, is

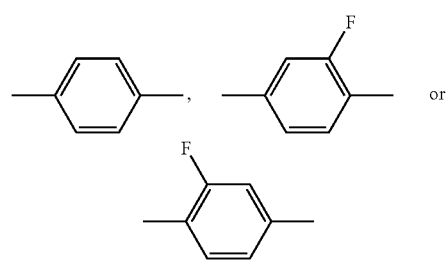

Z⁶¹ and Z⁶² are each a single bond, and r is 0 or 1.

18. The liquid crystal medium of claim 3, which comprises one or more compounds of the formula VI wherein R⁶¹ is alkyl, R⁶² is alkyl or alkenyl,

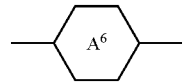

and in case it is occurring twice in each occurrence independently of each other, is

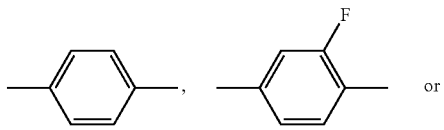

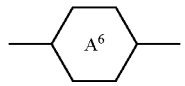

$Z^{61}$ and $Z^{62}$ are each a single bond, and
r is 0 or 1.

19. The liquid crystal medium of claim 5, which comprises one or more compounds of the formula VI wherein
$R^{61}$ is alkyl,
$R^{62}$ is alkyl or alkenyl,

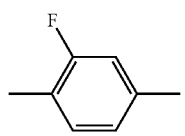

and in case it is occurring twice in each occurrence independently of each other, is

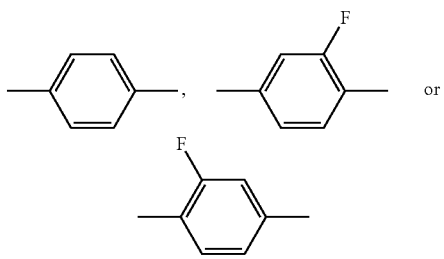

$Z^{61}$ and $Z^{62}$ are each a single bond, and
r is 0 or 1.

20. The liquid crystal medium of claim 1, which comprises one or more compounds of the formulae II-1a-1, II-1c-1 and II-1d-1:

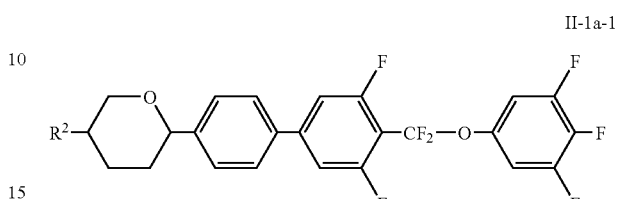
II-1a-1

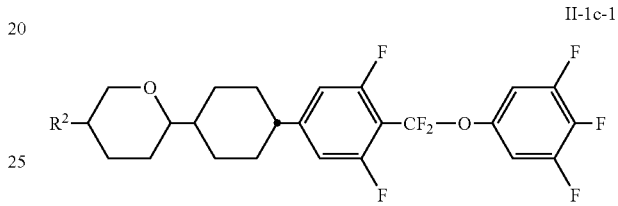
II-1c-1

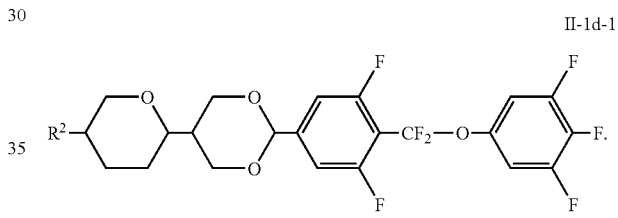
II-1d-1

21. The liquid crystal medium of claim 20, which comprises one or more compounds of formula II-1a-1.

22. The liquid crystal medium of claim 20, which comprises one or more compounds of formula II-1c-1.

23. The liquid crystal medium of claim 20, which comprises one or more compounds of formula II-1d-1.

* * * * *